(12) United States Patent
Mizukura et al.

(10) Patent No.: US 8,478,039 B2
(45) Date of Patent: Jul. 2, 2013

(54) INFORMATION PROCESSING DEVICE AND METHOD AND PROGRAM

(75) Inventors: Takami Mizukura, Kanagawa (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 12/799,804

(22) Filed: Apr. 30, 2010

(65) Prior Publication Data

US 2010/0296731 A1 Nov. 25, 2010

(30) Foreign Application Priority Data

May 22, 2009 (JP) ................................ P2009-124245

(51) Int. Cl.
*G06K 9/00* (2006.01)
(52) U.S. Cl.
USPC .......................................................... 382/167
(58) Field of Classification Search
USPC ........................ 382/166–167, 232–233, 298
See application file for complete search history.

(56) References Cited

U.S. PATENT DOCUMENTS

| | | | |
|---|---|---|---|
| 5,907,415 A * | 5/1999 | Yabe ............................. | 358/518 |
| 5,933,253 A | 8/1999 | Ito et al. | |
| 6,301,383 B1 | 10/2001 | Ito et al. | |
| 6,335,983 B1 | 1/2002 | McCarthy et al. | |
| 6,388,674 B1 | 5/2002 | Ito et al. | |
| 6,437,792 B1 | 8/2002 | Ito et al. | |
| 6,560,356 B1 | 5/2003 | Takahashi et al. | |
| 6,628,822 B1 | 9/2003 | Nakabayashi et al. | |
| 6,912,306 B1 | 6/2005 | Nakabayashi et al. | |
| 6,992,683 B2 * | 1/2006 | Shin et al. ..................... | 345/589 |
| 7,130,462 B2 | 10/2006 | Nakami | |
| 7,583,318 B2 * | 9/2009 | Ok et al. ....................... | 348/453 |
| 2003/0123722 A1 | 7/2003 | Newman | |
| 2005/0141848 A1 | 6/2005 | Deguchi et al. | |
| 2007/0133021 A1 * | 6/2007 | Lee et al. ....................... | 358/1.9 |
| 2007/0229864 A1 | 10/2007 | Sasaki | |

FOREIGN PATENT DOCUMENTS

| | | |
|---|---|---|
| EP | 1367816 A2 | 12/2003 |
| JP | 07-236069 A | 9/1995 |
| JP | 09-009082 A | 1/1997 |
| JP | 09-098298 A | 4/1997 |
| JP | 10-084487 A | 3/1998 |
| JP | 11-032228 A | 2/1999 |
| JP | 11-341296 A | 12/1999 |
| JP | 2000-175062 A | 6/2000 |
| JP | 2000-278546 A | 10/2000 |
| JP | 2003-153297 A | 5/2003 |
| JP | 3712424 B2 | 11/2005 |
| JP | 4061907 B2 | 3/2008 |

OTHER PUBLICATIONS

European Search Report EP 10162331, dated May 31, 2011.

* cited by examiner

*Primary Examiner* — Daniel Mariam
(74) *Attorney, Agent, or Firm* — Sony Corporation

(57) ABSTRACT

An information processing device includes: a control unit to determine whether to perform, according to the relation between a gamut of an image subjected to gamut conversion beforehand and a target gamut, a first conversion processing to perform gamut conversion processing to convert the gamut of the image into the target gamut after performing restoring processing to return at least a portion of the image gamut into the state before the gamut conversion, and a second conversion processing to perform the gamut conversion processing without performing the restoring processing; a restoring unit to execute the restoring processing according to control by the control unit; and a gamut conversion unit to execute the gamut conversion processing according to control by the control unit.

11 Claims, 35 Drawing Sheets

- - - RANGE VISIBLE WITH HUMAN EYE —— sRGB

|  | x | y |
|---|---|---|
| RED | 0.64 | 0.33 |
| GREEN | 0.3 | 0.6 |
| BLUE | 0.15 | 0.06 |
| WHITE | 0.3127 | 0.329 |

COLOR TEMPERATURE OF WHITE POINT (White): 6500 K

GAMUT CLIPPING

GAMUT CONVERSION

FIG. 19

Directory Entry for Tiff
RESTORING METADATA

| ADDRESS | | ROLE |
|---|---|---|
| X | GamutMeta | NAME OF Tag |
| X + 2 | 7 (Undefined) | TYPE OF VARIABLE MAKING UP Tag |
| X + 4 | 2 | NUMBER OF VARIABLES |
| X + 8 | α | REFERENCE OFFSET VALUE TO ADDRESS WHEREIN VARIABLES ARE STORED |

Value OF Directory Entry

| ADDRESS | | ROLE |
|---|---|---|
| Y + α | Double | TYPE OF FIRST DATA |
| Y + α + 2 | 37 | NUMBER OF PIECES OF FIRST DATA |
| Y + α + 6 | Y-Cusp data | FIRST MAIN DATA |
| (Y + α + 6) + (8 × 36) | Double | TYPE OF SECOND DATA |
| (Y + α + 6) + (8 × 36) + 2 | 37 | NUMBER OF PIECES OF SECOND DATA |
| ... | C-Cusp data | SECOND MAIN DATA |

| REFERENCE NUMBER | COLOR SPACE 1 | COLOR SPACE 2 |
|---|---|---|
| 1 | sRGB | Apple RGB |
| 2 | Adobe RGB | NTSC RGB |
| 3 | bg-RGB | |
| 4 | sc-RGB | |

601

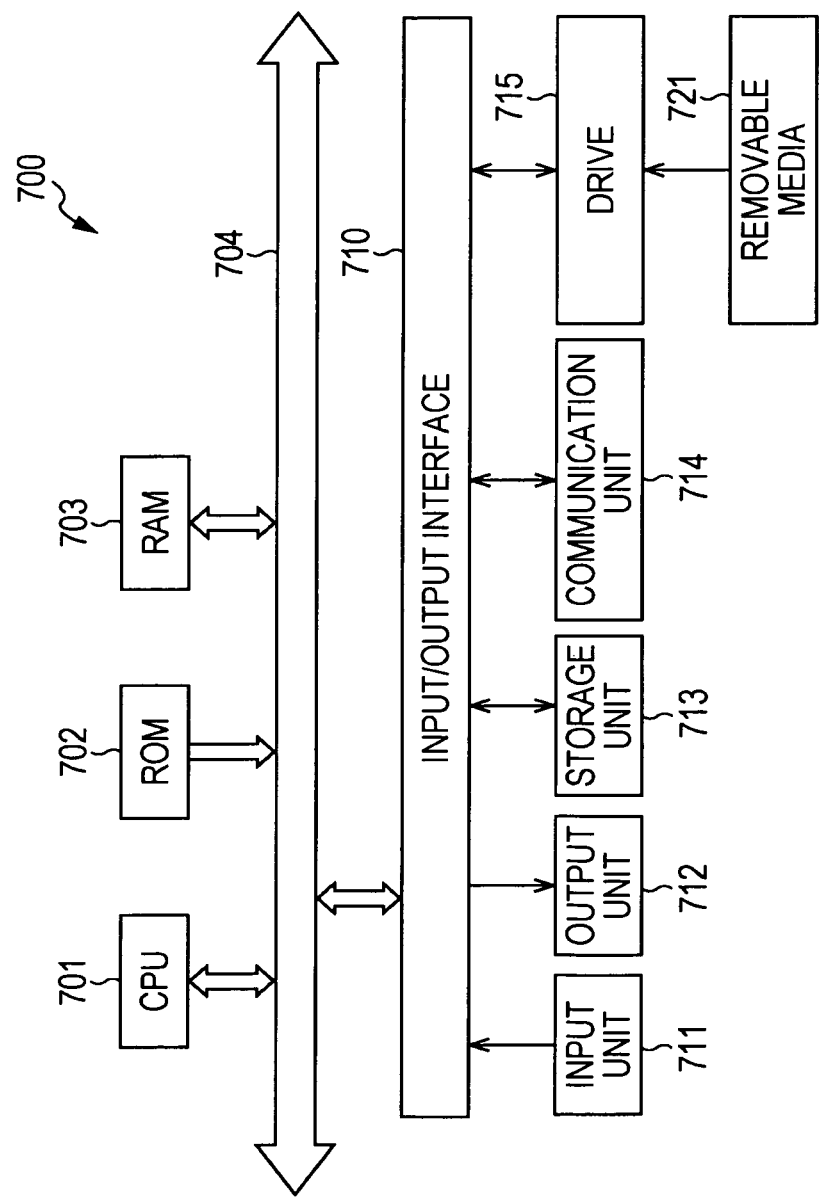

INFORMATION PROCESSING DEVICE AND METHOD AND PROGRAM

CROSS-REFERENCE TO RELATED APPLICATION

The present application claims priority from Japanese Patent Application No. JP 2009-124245 filed in the Japanese Patent Office on May 22, 2009, the entire content of which is incorporated herein by reference.

BACKGROUND OF THE INVENTION

1. Field of the Invention

The present invention relates to an information processing device and method and program, and in particular relates to an information processing device and method and program that can more appropriately perform gamut conversion of content.

2. Description of the Related Art

Heretofore, a method using sRGB color space, which is a standard color space for monitors, has been used as a color space to express RGB data. For example, on a personal computer, upon JPEG (Joint Photographic Experts Group) data that is generally used being opened, the sYCC data that is recorded in the JPEG data is immediately converted to sRGB data. If there is data outside the sRGB gamut (i.e. negative value or value of greater than 256 of an 8-bit value) in the sYCC data, a natural clip to sRGB color space occurs, and color distortion can occur.

A natural clip indicates a phenomenon whereby a color outside the gamut of the image data supplied externally is forcibly expressed with the colors in the gamut of the device. For example, in the case that only the R-component of a certain color expressed with RGB is greater than the maximum value of the R-component of the gamut, the R-component of the color is expressed with the maximum value of the R-component in the gamut (natural clip). At this time, the RGB balance of the original RGB becomes off-balance due to natural clipping, and the hues change. This kind of hue change is called "color distortion". That is to say, the color expressed is different than the original color, so this kind of color distortion is not desirable.

In order to prevent this, there is a method to perform gamut conversion beforehand to compress the gamut of the image data on the recording device side to the sRGB gamut beforehand. With this gamut conversion, the original sYCC data has already been compressed to the sRGB gamut, whereby even when the JPEG data is opened and converted to sRGB, data outside the gamut is not generated. That is to say, the occurrence of the above-described color distortion can be suppressed.

However, sRBG represents the gamut of a standard personal computer monitor, but when compared to a printing device or wide gamut liquid crystal television receiver (wide gamut liquid crystal TV), there are clearly portions that are narrow.

FIG. 1 is a schematic diagram showing a comparison state of gamut ranges. As in the example shown in FIG. 1, the gamut 1 of a general inkjet printer is narrower than the sRGB gamut 2 in many hues, but is wider only for many blue/green regions. Also, generally, the color gamut 3 of a wide gamut liquid crystal TV is wider than the sRGB gamut 2 in all hues.

However, once a gamut of picture content is converted to a narrow sRGB gamut, the originally recorded information before compression is lost. This information is inexpressible, regardless of the gamut of the output device, even with a wide gamut liquid crystal TV which has a wide gamut. That is to say, by converting the gamut to a narrow gamut, the image quality of the picture content may deteriorate unnecessarily.

Therefore, various proposals have been given for methods to restore the data that has been compressed once and to recompress to the gamut of the output device (e.g., see Japanese Unexamined Patent Application Publication No. 09-9082 and Japanese Patent No. 4061907 (corresponding to U.S. Pat. No. 7,130,462)).

Japanese Unexamined Patent Application Publication No. 09-9082 discloses a method whereby, in the event of printing barcode information showing profile data to paper together with an image, and printing with a separate printing device, the gamut is recompressed for use with another printing device by scanning the barcode information.

Also, Japanese Patent No. 4061907 discloses a method whereby information before compression of the compressed RGB data (maximum/minimum values, compression table, etc) is read in, image data is restored, and the gamut is recompressed for the final output device.

SUMMARY OF THE INVENTION

However, conditions for executing the restoring processing have been disclosed in neither Japanese Unexamined Patent Application Publication No. 09-9082 nor Japanese Patent No. 4061907, so restoring processing has been performed constantly. Therefore, restoring processing is likely to be performed unnecessarily. Thus, not only is the load increased unnecessarily, but image quality of the content may also be unnecessarily reduced.

It has been found desirable to enable performing content gamut conversion more appropriately.

According to an embodiment of the present invention, an information processing device includes a control unit to determine whether to perform, according to the relation between a gamut of an image subjected to gamut conversion beforehand and a target gamut, a first conversion processing to perform gamut conversion processing to convert the gamut of the image into the target gamut after performing restoring processing to return at least a portion of the image gamut into the state before the gamut conversion, and a second conversion processing to perform the gamut conversion processing without performing the restoring processing; a restoring unit to execute the restoring processing according to control by the control unit; and a gamut conversion unit to execute the gamut conversion processing according to control by the control unit.

In the case that the target gamut includes other than the image gamut, the control unit may execute the first conversion processing, the restoring unit may execute the restoring processing as to the image unit and the gamut conversion unit may execute the gamut conversion processing as to the image subjected to the restoring processing; and wherein in the case that the target gamut does not include other than the image gamut, the control unit may execute the second conversion processing, and the gamut conversion unit may execute the gamut conversion processing as to the image.

In the case that the target gamut includes other than within a predetermined range wider than the image gamut, the control unit may execute the first conversion processing, the restoring unit may execute the restoring processing as to the image, and the gamut conversion unit may execute the gamut conversion processing as to the image subjected to the restoring processing; and wherein in the case that the target gamut does not include other than within the range, the control unit may execute the second conversion processing, and the gamut conversion unit may execute the gamut conversion processing as to the image.

In the case that, of the hues in said target gamut, the ratio of hues including other than the image gamut as to all hues is greater than a predetermined ratio, the control unit may execute the first conversion processing, the restoring unit may execute the restoring processing as to the image, and the gamut conversion unit may execute the gamut conversion processing as to the image subjected to the restoring processing; and wherein in the case that the ratio is not greater than the predetermined ratio, the control unit may execute the second conversion processing, and the gamut conversion unit may execute the gamut conversion processing as to the image.

In the case of a predetermined hue wherein the target gamut includes other than the image gamut, the control unit may execute the first conversion processing, the restoring unit may execute the restoring processing as to the image, and the gamut conversion unit may execute the gamut conversion processing as to the image subjected to the restoring processing; and wherein in the case that a predetermined hue includes the target gamut includes other than the image gamut, the control unit may execute the second conversion processing, and the gamut conversion unit may execute the gamut conversion processing as to the image.

The control unit may compare the image gamut and the target gamut for each hue.

In the case that the brightness value of a maximum saturation point of the target gamut is smaller than the brightness value of a maximum saturation point of the image gamut, the control unit may compare the saturation value of a point of which the brightness value is the same as the maximum saturation point of the image gamut and the saturation value of the maximum saturation point of the image which are on a straight line linking the maximum saturation point of the target gamut and a black point; and wherein in the case that the brightness value of a maximum saturation point of the target gamut is the same as or greater than the brightness value of a maximum saturation point of the image gamut, the control unit may compare the saturation value of a point of which the brightness value is the same as the maximum saturation point of the image gamut and the saturation value of the maximum saturation point of the image which are on a straight line linking the maximum saturation point of the target gamut and a white point.

The control unit may compare the image gamut and the target gamut, using a gamut comparison table that indicates the size relation of known standard gamut differences.

The control unit may execute the first conversion processing or the second conversion processing only in the case that the image gamut does not match the target gamut.

The information processing device further may include a playing unit to read and play the image from a recording medium, wherein the control unit determines which of the first conversion processing or the second conversion processing to perform as to the image read from the recording medium by the playing unit.

According to an embodiment of the present invention, an information processing method includes the steps of: determining of whether to perform, with a control unit of an information processing device, according to the relation between a gamut of an image subjected to gamut conversion beforehand and a target gamut, a first conversion processing to perform gamut conversion processing to convert the gamut of the image into the target gamut after performing restoring processing to return at least a portion of the image gamut into the state before the gamut conversion, and a second conversion processing to perform the gamut conversion processing without performing the restoring processing; executing of, with a restoring unit of the information processing device, the restoring processing according to control by the control unit; and executing of, with a gamut conversion unit of the information processing device, the gamut conversion processing according to the determination.

According to an embodiment of the present invention, a program to cause a computer to function includes: a control unit to determine whether to perform, according to the relation between a gamut of an image subjected to gamut conversion beforehand and a target gamut, a first conversion processing to perform gamut conversion processing to convert the gamut of the image into the target gamut after performing restoring processing to return at least a portion of the image gamut into the state before the gamut conversion, and a second conversion processing to perform the gamut conversion processing without performing the restoring processing; a restoring unit to execute the restoring processing according to control by the control unit; and a gamut conversion unit to execute the gamut conversion processing according to control by the control unit.

According to the above configurations, determination is made as to whether to perform, according to the relation between a gamut of an image subjected to gamut conversion beforehand and a target gamut, a first conversion processing to perform gamut conversion processing to convert the image gamut into the target gamut after performing restoring processing to return at least a portion of the image gamut into the state before the gamut conversion, and a second conversion processing to perform the gamut conversion processing without performing the restoring processing; and restoring processing and gamut conversion processing are executed according to the determination thereof. Thus, information can be processed, and in particular, gamut conversion of content can be performed more appropriately.

BRIEF DESCRIPTION OF THE DRAWINGS

FIGS. 7A and 7B are schematic diagrams illustrating an example of a gamut;

FIG. 19 is a diagram illustrating an example of a recording format for gamut metadata;

FIG. 33 is a diagram illustrating an example of a gamut comparison table;

FIG. 35 is a block diagram illustrating a primary configuration example of a personal computer to which the present invention has been applied.

DESCRIPTION OF THE PREFERRED EMBODIMENTS

Embodiments of the invention (hereafter called "embodiments") will be described below. Note that the description will be given in the following order.

1. First Embodiment (Information Processing System)
2. Second Embodiment (Restoring Converting Processing)
3. Third Embodiment (Restoring Converting Processing)
4. Fourth Embodiment (Restoring Converting Processing)
5. Fifth Embodiment (Restoring Converting Processing)
6. Sixth Embodiment (Personal Computer)

1. First Embodiment

[Device Configuration]

Figure 1:
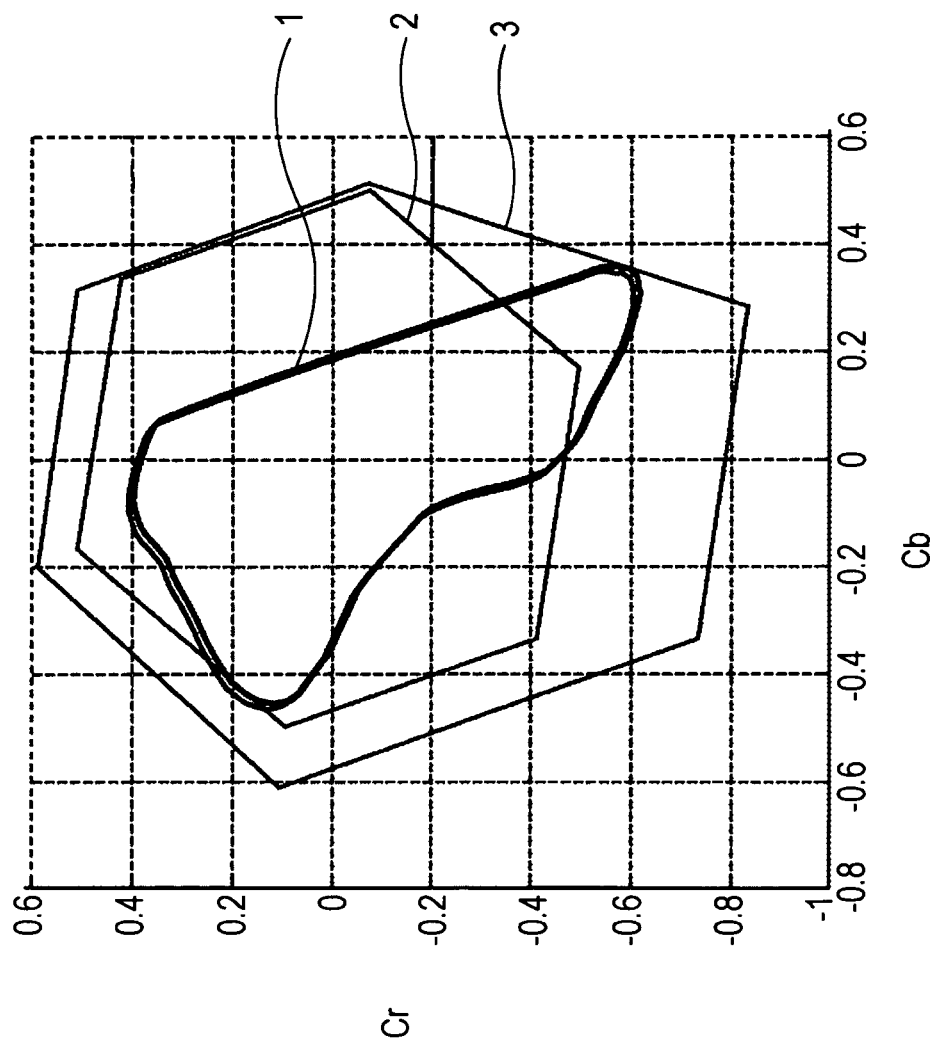
FIG. 1 is a schematic diagram illustrating the state of comparison of gamut ranges.
Figure 2:
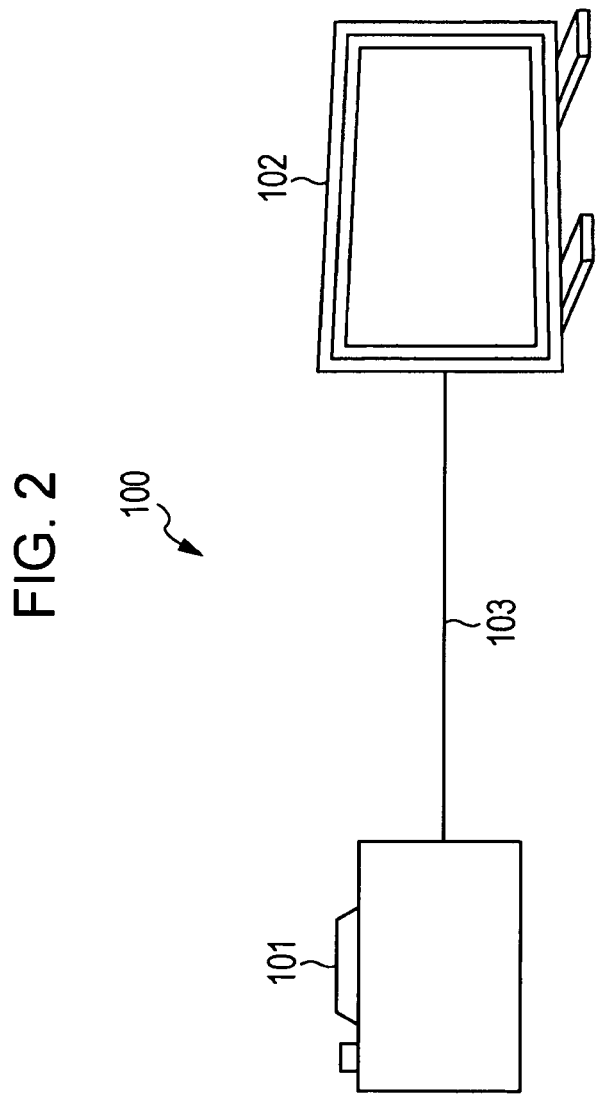
FIG. 2 is a diagram illustrating a configuration example of an information processing system to which the present invention has been applied.

FIG. 2 is a diagram showing a configuration example of an information processing system to which the present invention has been applied. An information processing system 100 shown in FIG. 2 has a monitor 102 connected to a digital still camera 101 via an HDMI (High-Definition Multimedia Interface) cable 103.

The digital still camera 101 images a subject, and generates image data (content). The digital still camera 101 records the image data onto a writable optical disk. The digital still camera 101 further reads and plays the image data recorded on the optical disk, and displays this on a monitor (unshown) that the digital still camera 101 has, or supplies this to the monitor 102 via the HDMI cable 103 and displays this on the monitor 102.

Thus, the information processing system 100 performs image data generating (obtaining), recording, reading (playing), and output (image display). That is to say, the information processing system 100 has a recording device, playing device, and output device.

The recording device records the image data obtained by imaging or obtained from an external system, for example, onto a recording medium. For example, the recording device images a subject with an image sensor such as a CCD (Charge Coupled Device), CMOS (Complementary Metal Oxide Semiconductor), or the like, onto recording media (recording medium) such as a memory card, magnetic tape, DVD, or the like. For example, this recording device may be a digital still camera, video camera, film scanner, cellular telephone with camera, or the like.

The playing device reads the image data recorded on the recording medium and supplies this to the output device. The playing device is a device having a function to play a video recorded on some sort of recording media, for example. For example, the playing device may be a video tape player, DVD player, Blu-ray disk player, as well as a digital still camera, video camera, cellular telephone or the like having a playing function.

The output device displays an image of the image data supplied from the playing device. The output device is, for example, a device having a function to output a picture signal with some type of method. For example, the output device may be a television receiver, projector, printer, as well as a digital still camera, video camera, cellular telephone or the like.

In the case of FIG. 2, the digital still camera 101 can serve as the recording device, playing device, and output device, and the monitor 102 can serve as the output device. The HDMI cable 103 is a communication bus to connect the playing device and output device, and an optical disk is the recording medium.

The information processing system 100 is a system to perform conversion and restoring of an image data gamut more appropriately in the processing related to image data such as described above.

The ranges of gamut that the digital still camera 101 and monitor 102 can display are each limited. Accordingly, in a normal case, the gamut of the image data has to be subjected to gamut conversion processing to match the output device, but the playing device and output device do not necessarily have the functions thereof. Also, at the time of image data recording, the type of device that will play/output the data is unknown.

Thus, in order to suppress the occurrence of color distortion resulting from natural clipping, in the event of recording image data onto an optical disk, the digital still camera 101 serving as the recording device converts the gamut of the image data to predetermined gamut having a limited range beforehand.

It is desirable for the gamut of the image data to match the gamut that the output device can handle. For example, a portion of the gamut of the image data that is wider than the gamut of the output device may result in color distortion. That is to say, if compression of the gamut by the gamut conversion is small and the gamut of the image data is too wide as to the gamut of the output device, this may result in image quality being deteriorated by color distortion occurring or the like. Conversely, a portion of the gamut of the image data that is narrower than the gamut of the output device may result in not drawing out the capability of the output device maximally. That is to say, if the gamut of the image data is made too narrow by the gamut conversion, reproducibility of the color is unnecessarily reduced, which may result in deterioration of image quality.

However, the gamut that can be displayed on the monitor of the digital still camera 101 and the gamut that can be displayed on the monitor 102 are not necessarily the same as one another. That is to say, depending on the output device to be used, the gamut that can be handled may differ from one device to another.

Now, the digital still camera 101 serving as the recording device converts the gamut of the image data to a predetermined gamut that is generally considered to be appropriate and records this on an optical disk. This gamut conversion is called "temporary compression". The digital still camera 101 serving as the playing device reads the image data subjected to temporary compression from the optical disk, and converts again the gamut of the image data so as to match the gamut that can be displayed on the output device (digital still camera 101 or monitor 102). This gamut conversion is called "main compression".

At this time, in the case that the gamut of the image data is wider than the gamut of the output device, the digital still camera 101 serving as the playing device performs the second gamut conversion (main compression), and converts the gamut of the image data to the gamut of the output device.

Also, in the case that the gamut of the image data is narrower than the gamut of the output device, the digital still camera 101 serving as the playing device returns the gamut of the image data to the state before temporary compression, and converts again the gamut of the image data to the gamut of the output device (performs main compression). That is to say, the digital still camera 101 serving as the playing device restores the original gamut of the image data, and performs anew the appropriate gamut conversation according to the gamut of the output device.

Restoring the gamut is processing to return a portion or all of the gamut of the image data to the state before the gamut conversion. Note that in the case that the gamut before gamut conversion is extremely wide, as with the image data obtained by imaging, restoring the gamut in a truly complete manner is difficult, but at least a portion (actually usable portion) can be restored.

After first performing restoring processing as to the image that has been subjected to gamut conversion before, and at least a portion of the image gamut is temporarily returned to the state before gamut conversion, the processing to perform gamut conversion and convert the image gamut to a target gamut will be hereinafter referred to as "first conversion processing". Also, performing a gamut conversion processing without performing restoring processing as to an image that has been subjected to gamut conversion is performed, and further converting the gamut of the image subjected to gamut conversion beforehand to a target gamut will be hereinafter referred to as "second conversion processing". The digital still camera 101 serving as the playing device determines which of the first conversion processing or second conversion processing to perform as to the image, according to the relation between the gamut of the image subjected to gamut conversion beforehand and the target gamut, and executed the processing that is determined. Thus, even in the case that the gamut of the image data is narrower than the targeted gamut from the temporary compression, the digital still camera 101 serving as the playing device can match appropriately to the target gamut, whereby the color reproducibility of the output device can be maximized, thereby suppressing deterioration of the image quality.

Note that, in order for the digital still camera 101 serving as the playing device to perform such processing, the digital still camera 101 serving as the recording device appends the metadata for gamut conversion (gamut metadata) and the metadata for restoring the gamut to the image data subjected to temporary compression of the gamut, and records this together with the image data on the optical disk. The digital still camera 101 serving as the playing device uses the metadata to perform gamut conversion processing and restoring processing.

Now, as described above, the digital still camera 101 serving as the playing device performs gamut conversion processing and restoring processing as appropriate, according to the gamut of the image data and the gamut of the output device. In other words, the digital still camera 101 serving as the playing device does not necessarily perform restoring processing and gamut conversation processing constantly. This is because, for example, there are cases wherein the gamut of the output device is narrower than the gamut of the image data subjected to temporary compression, or cases wherein the played image data is the data subjected to main compression (main compression data), so restoring processing and gamut conversion processing does not necessarily have to be performed, and performing restoring processing and gamut conversion processing constantly may result in inefficient processing.

In order to enable the digital still camera 101 serving as the playing device to appropriately perform gamut conversion processing and restoring processing, the digital still camera 101 serving as the recording device controls the image data gamut conversion method, and the appending and recording of the gamut metadata and restoring metadata and so forth. Also, the digital still camera 101 itself serving as the playing device performs confirming of the image data gamut conversion status and comparison of the gamuts of the image data and output device, and so forth. The digital still camera 101 serving as the playing device controls execution of the image data gamut conversion processing and restoring processing, based on the results thereof.

Note that in FIG. 2, the digital still camera 101 shows an example of a recording device, playing device, and output device. These devices may be devices other than the digital still camera, and may be devices having any sort of functions as long as the devices perform gamut conversion and restoring. For example, this may be an information processing device which obtains image data from an external device and performs image processing.

Also, the recording device, playing device, and output devices may each be different devices. As with the digital still camera 101 and monitor 102, the recording device and playing device may be configured as one device which is separate from the output device. Further, the playing device and output device may be configured as one device separate from the recording device.

The optical disk is an example of a recording medium (storage medium) to record the image data, and may be anything as long as the recording medium is writable (recordable or rewritable). For example, a CD-R (Compact Disc-Recordable) or CD-RW (Compact Disc-Rewritable) may be used.

Also, for example, a DVD±R (Digital Versatile Disc±Recordable) or DVD±RW (Digital Versatile Disc±Rewritable) may be used. Further, for example, a DVD-RAM (Digital Versatile Disc-Random Access memory), BD-R (Blu-ray Disc-Recordable), or BD-RE (Blu-ray Disc-Rewritable) may be used. It goes without saying that an optical disk (recording medium) other than these standards may be used, as long as the medium corresponds to the recording device and playing device.

Also, instead of an optical disk, a flash memory, hard disk, or tape device or the like may be used. Further, a built-in recording medium instead of a portable removable media may be used. It goes without saying that the recording medium may be configured as a separate unit from the digital still camera 101, as with a peripheral device or a server or the like.

Note that the gamut conversion is processing to modify the gamut range. Accordingly, cases to narrow the gamut and cases to widen the gamut are included. For example, narrowing the gamut of certain portions and widening another portion is also included. However, generally speaking, gamut conversion has more cases of gamut compression to narrow the gamut. Accordingly, the description below will give examples basically in the case of gamut compression. However, with the description below, gamut decompression to widen the gamut can also be basically applied.

Figure 3:
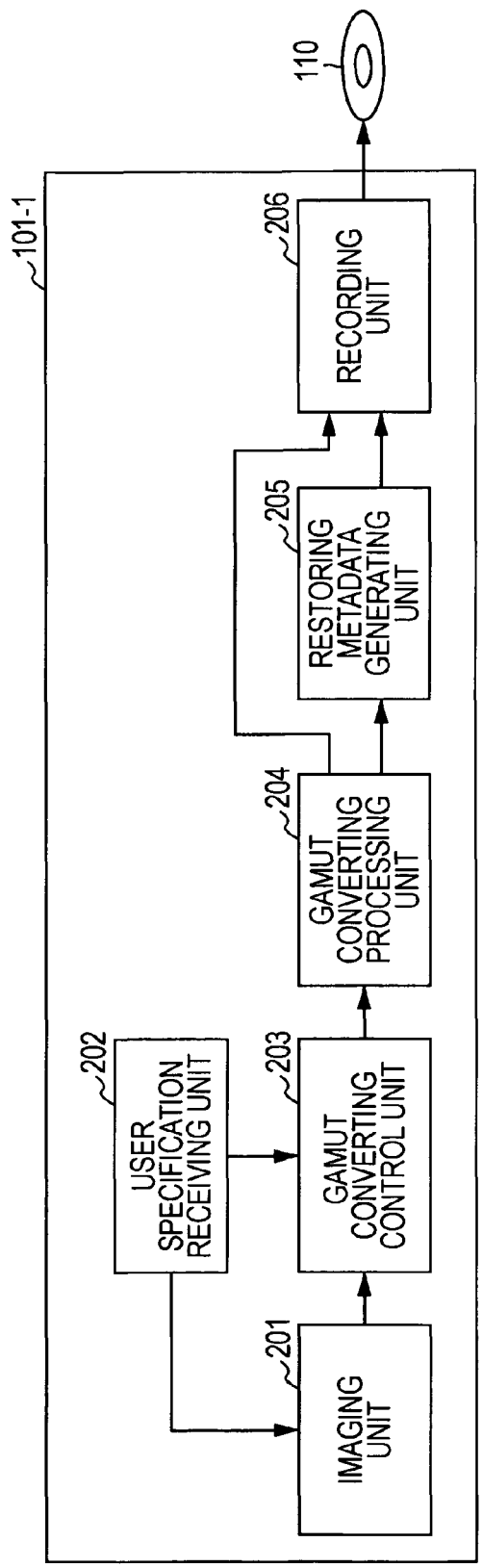
FIG. 3 is a block diagram illustrating a configuration example relating to a recording of the digital still camera in FIG. 2.

Next, the configuration of the digital still camera 101 will be described. FIG. 3 is a block diagram showing a primary configuration example relating to the recording of the digital still camera 101 in FIG. 2. As shown in FIG. 3, the digital still camera 101-1 serving as the recording device has an imaging unit 201, user specification receiving unit 202, gamut conversion control unit 203, gamut conversion processing unit 204, restoring metadata generating unit 205, and recording unit 206.

The imaging unit 201 images a subject based on user instructions received by the user specification receiving unit 202, generates the image data, and supplies this to the gamut converting control unit 203. The user specification receiving unit 202 has a user interface such as switches and buttons for example, and by way of these receives the specifications (instructions) for operation from the user. The user specification receiving unit 202 supplies the input user specifications to the imaging unit 201 and gamut conversion control unit 203.

The gamut conversion control unit 203 selects the optimal method for gamut conversion based on the user specifications and various types of settings, values, and so forth. The gamut conversion processing unit 204 converts the image data gamut and generates the gamut metadata indicating the gamut after conversion, based on control by the gamut conversion control unit 203 (with the selected method).

In the case of controlling so as to generate the restoring metadata by the gamut conversion control unit 203, upon obtaining the image data subjected to gamut conversion and gamut metadata from the gamut conversion processing unit 204 based on control by the gamut conversion control unit 203, the restoring metadata generating unit 205 generates the restoring metadata for restoring the gamut before gamut conversion. The restoring metadata generating unit 205 supplies the image data, gamut metadata, and restoring metadata to the recording unit 206.

In the case of controlling by the gamut conversion control unit 203 so as not to generate restoring metadata, the gamut conversion processing unit 204 supplies the image data and gamut metadata to the recording unit 206 without going via the restoring metadata generating unit 205.

The recording unit 206 shows the writing function of a drive whereupon an optical disk 110 for example is mounted. The recording unit 206 records the image data and gamut metadata supplied from the gamut conversion processing unit 204 or the image data, gamut metadata, and restoring metadata supplied from the restoring metadata generating unit 205 to the optical disk 110 mounted on the drive, as content.

Figure 4:
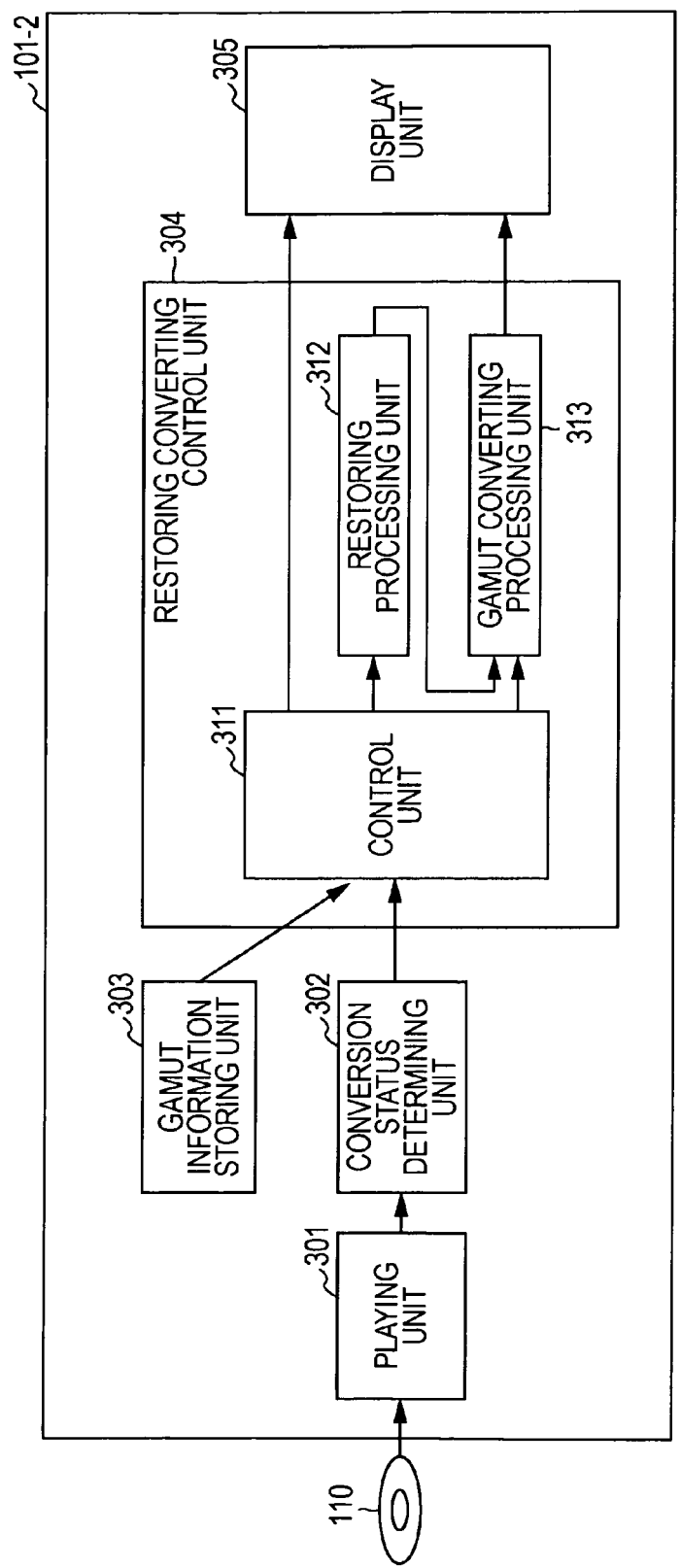
FIG. 4 is a block diagram illustrating a configuration example relating to playing output of the digital still camera in FIG. 2.

FIG. 4 is a block diagram showing a primary configuration example relating to the playing output of the digital still camera 101 in FIG. 2. As shown in FIG. 4, the digital still camera 101-2 serving as the playing device and output device has a playing unit 301, conversion status determining unit 302, gamut information storage unit 303, restoring conversion processing unit 304, and display unit 305.

The playing unit 301 shows a reading function of the drive whereupon an optical disk 110 for example is mounted. The playing unit 301 reads content (e.g., image data, gamut metadata, and restoring metadata) from the optical disk 110 mounted on the drive, and supplies this to the conversion status determining unit 302.

The conversion status determining unit 302 determines the conversion status of the image data such as whether the compression is temporary compression or main compression, for example, based on various types of information such as header information and flag information of the image data supplied from the playing unit 301, gamut metadata, restoring metadata, and so forth. The conversion status determining unit 302 supplies the determination results thereof to the control unit 311 of the stored conversion processing unit 304, together with all of the content data.

The gamut information storage unit 303 has a predetermined storage medium such as a ROM (Read Only Memory), RAM (Random Access Memory), hard disk, optical, flash memory, or the like, and stores the gamut information which shows the gamut that the display unit 305 can display. The gamut information storage unit 303 supplies the gamut information thereof to the control unit 311 of the restored conversion processing unit 304, as appropriate.

The restoring conversion processing unit 304 performs gamut conversion processing and restoring processing of the image data. The restoring conversion processing unit 304 has a control unit 311, restoring processing unit 312, and gamut conversion processing unit 313.

The control unit 311 compares the gamut of the display unit 305 supplied from the gamut information storage unit 303 and the gamut of the image data shown in the gamut metadata. The control unit 311 controls the execution of the gamut conversion processing and restoring processing according to the comparison results thereof and the gamut conversion status and so forth.

For example, in the case of restoring the original gamut of the image data, the control unit 311 supplies the image data to the restoring processing unit 312. That is to say, the control unit 311 supplies the image data to the display unit 305 via the restoring processing unit 312 and the gamut conversion processing unit 311. Also, for example, in the case of subjecting the image data to gamut conversion, the control unit 311 supplies the image data to the gamut conversion processing unit 311 without going via the restoring processing unit 312. That is to say, the control unit 311 supplies the image data to the display unit 305 via the gamut conversion processing unit 313 only. Further, for example, in the case that the gamut of the image data is subjected to main compression, the control unit 311 supplies the image data to the display unit 305 without going through the gamut conversion processing unit 313 or restoring processing unit 312.

The restoring processing unit 312 is controlled by the control unit 311 to perform restoring processing, and returns the gamut of the image data supplied from the control unit 311 to the state before temporary compression. The restoring processing unit 312 supplies the image data subjected to restoring processing to the gamut conversion processing unit 313.

The gamut conversion processing unit 313 is controlled by the control unit 311 to perform gamut conversion processing, and performs main compression to compress the gamut of the image data supplied from the control unit 311 or restoring processing unit 312 to the gamut of the display unit 305. The gamut conversion processing unit 313 supplies the image data of which the gamut has been subjected to main compression to the display unit 305.

The display unit 305 is a monitor that displays the image of the supplied image data, made up of an LCD (Liquid Crystal Display) or organic EL display (Organic Electroluminescence Display) or the like.

Next, a case of displaying the image on the monitor of the digital still camera 101 will be described. In the case of displaying the image on the monitor 102, the digital still camera 101 only has to understand beforehand the gamut of the monitor 102, and store this in the gamut information storage unit 303, for example. Other than supplying the image data subjected to main compression to the monitor 102 is basically the same as the case of displaying on the monitor of the digital still camera 101, so the description thereof will be omitted.

[Processing at Time of Recording]

Next, processing at the time of recording that the digital still camera 101-1 (digital still camera 101 serving as a recording device) executes will be described.

Figure 5:
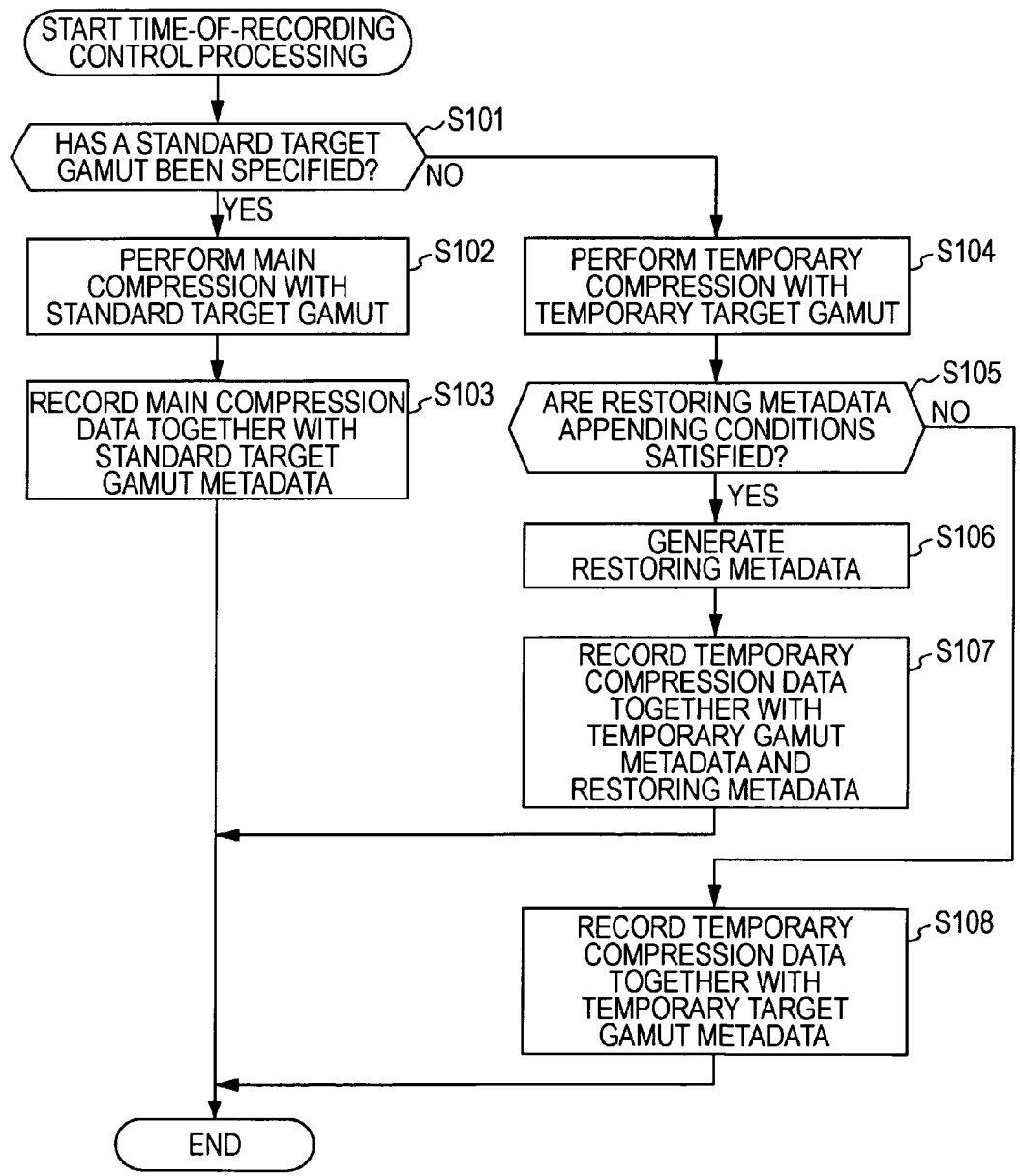
FIG. 5 is a flowchart describing an example of the flow of time-of-recording control processing.

In the event of recording the image data generated with the imaging unit 201 on the optical disk 110, the digital still camera 101-1 executes time-of-recording control processing, and performs gamut conversion of image data. An example of the flow of the time-of recording control processing will be described with reference to the flowchart in FIG. 5.

Upon the time-of-recording control processing starting, in step S101 the gamut conversion control unit 203 determines whether or not the standard target gamut in the information processing system 100 has been specified, based on user specifications received from the user specification receiving unit 202, user specifications received and stored beforehand, various types of setting values updated by the user specifications, or other various types of setting values, and so forth. The standard target gamut is a gamut defined beforehand as the standard value of the target gamut which is the final gamut of the image data. Generally, a comparatively narrow gamut such as sRGB is applied to the standard target gamut.

The gamut conversion control unit 203 determines whether or not the standard target gamut has been specified as the gamut after conversion. In the case determination is made that the standard target gamut has been specified, the flow is advances to step S102. In step S102 the gamut conversion processing unit 204 performs main compression as to the image data gamut with the standard target gamut.

Now, main compression means to convert the gamut of the image data to the gamut at time of image output, i.e. to the final gamut. For example, the gamut at time of photographing is sufficiently large and similar to unlimited. However, as it is, the colors expressed with the playing device and output device can break down, so the gamut conversion of the image data is performed. At this time, converting to the gamut in the event of the image being output from the output device is called "main compression". In a normal case, the output device to be used at the time of recording is uncertain, so the main compression target gamut at this stage is the standard target gamut. Also, narrowing the gamut unnecessarily is meaningless, so generally the target gamut at time of main compression becomes the narrowest gamut. That is to say, generally, the narrowest gamut of the gamuts used with the information processing system 100 becomes the standard target gamut.

The recording unit 206 records the main compression data obtained from main compression by the gamut conversion processing unit 204 on the optical disk 110 together with the gamut metadata (standard target gamut metadata), and ends the time-of-recording control processing.

Also, in step S101, in the case determination is made that the standard target gamut is not specified, the flow is advanced to step S104. In step S104, the gamut conversion processing unit 204 is controlled by the gamut conversion control unit 203 to perform temporary compression with the temporary target gamut specified with the user specification received with the user specification receiving unit 202.

Temporary compression is compression other than main compression. The target gamut of the temporary compression has no restrictions. However, there are many cases wherein a gamut wider than the target gamut at the time of main compression becomes the target gamut. At the point in time that the image data is recorded on the optical disk 110, the type of output device that the image data will be output from is unknown. Thus, for safety (in order for error to not occur in later stages), the gamut conversion processing unit 204 converts the image data color gamut to a temporary target gamut defined based on user instructions, and records the image data after the gamut conversion on the optical disk 110. This type of gamut conversion is called "temporary compression".

Upon the temporary compression ending, in step S105 the gamut conversion control unit 203 determines whether or not the restoring metadata appending conditions determined beforehand will stand. In the case determination is made that the restoring metadata appending conditions are satisfied, the flow is advanced to step S106.

In step S106, the restoring metadata generating unit 205 generates the restoring metadata referenced in the case of restoring processing. In step S107, the recording unit 206 records the temporary compression data obtained by temporary compression on the optical disk 110, together with the gamut metadata thereof (temporary target gamut metadata) and the restoring metadata generated by the processing in step S106, and ends the time-of-recording control processing.

Also, in the case determination is made in step S105 that the restoring metadata appending conditions are not satisfied, the flow is advanced to step S108. In step S108, the recording unit 206 records the temporarily compressed data obtained by temporary compression on the optical disk 110 together with the gamut metadata thereof (temporary target gamut metadata), and ends the time-of-recording control processing. That is to say, in this case, the restoring metadata is not appended.

With the above-described time-of-recording control processing, the restoring metadata appending conditions in step S105 are conditions to be satisfied in order to append the restoring metadata. The content of these conditions is basically optional.

For example, for the user to specify the attaching of the restoring metadata may be a restoring metadata appending condition. In other words, in this case, determination is made as to whether or not restoring metadata is appended by user specification.

In the case determination is made in step S105 that the user has specified the attaching of the restoring metadata, the flow is advanced to step S106. That is to say, restoring metadata is generated, attached to the image data and recorded. The digital still camera 101-2 can use the restoring metadata to execute the restoring processing. Conversely, in the case determination is made in step S105 that the user has not specified the attaching of the restoring metadata, the flow is advanced to step S108. That is to say, restoring metadata is not generated. Accordingly, the digital still camera 101-2 does not execute the restoring processing.

Also, for example, for the word length of the compressed data to be recorded to be a predetermined length (e.g. 9 bits) may be a restoring metadata appending condition. Generally, image data word length is often 8 bits or shorter, but some image data have be 9 bit or longer word length for high gradient images.

In the case that the word length of the image data is shorter than 9 bits (i.e. 8 bits or shorter), even if the restoring metadata is attached and restoration is performed, there is a high possibility that gradient deterioration will occur in the image data restored with insufficient image data accuracy. To manage this, a method may be considered to reduce gradient deterioration by using difference distribution methods in the vicinity where gradient deterioration occurs even in the case that accuracy is insufficient, but processing becomes complicated to this method is often not used. In many cases, the restoring processing generally just has simple data extension performed by individual pixels. Accordingly, even if the 8-bit data is restored, usable restoring data may not be obtainable. Thus, in order to enable executing the restoring processing only in cases of image data having high-gradient word length (e.g. 9 bits or longer), the restoring metadata is generated and appended to the image data.

In the case determination is made in step S105 that the word length of the image data is 9 bits or longer (i.e., the image is a high gradient image), the flow is advanced to step S106. That is to say, the restoring metadata is generated, attached to the image data, and recorded. The digital still camera 101-2 can use the restoring metadata to execute the restoring processing. Conversely, in the case determination is made in step S105 that the word length of the image data is 8 bits or shorter (i.e., the image is not a high gradient image), the flow is advanced to step S108. That is to say, restoring metadata is not generated. Accordingly, the digital still camera 101-2 does not execute the restoring processing.

Note that the bit length to serve as a threshold of whether or not the image is high gradient is optional. For example, this may be 10-bit, 12-bit, and so forth, or may be 6-bit and so forth. Also, the user may be enabled to set this arbitrarily.

Also, there may be cases wherein the word length of the image data is determined based on other conditions such as the image data format or the like, for example. For example, in the case of a bitmap (BMP) format or in the case of a JPEG (Joint Photographic Experts Group) format, the word length of a still image may be 8 bits.

Accordingly, determination may be made at the point in time that the image is generated at the imaging unit 201 whether or not restoring metadata will be appended. In such a case, the processing in step S105 is omitted, and one of the processing is executed of the processing in both steps S106 and S107 or the processing in step S108.

Thus, the gamut conversion control unit 203 determines the target gamut specified by the user, the gamut conversion processing unit 204 converts the image data to the gamut specified thereof, and further, in the case of temporary compression predetermined restoring metadata appending conditions are satisfied, at which time the restoring metadata generating unit 205 generates and attaches the restoring metadata.

Thus, by performing recording control processing, the gamut conversion control unit 203 can control whether or not to enable the digital still camera 101-2 to execute restoring processing. That is to say, the digital still camera 101-1 can be made to perform control of the restoring processing and gamut conversion processing with consideration for situations at the time of recording such as user specifications, image data word length, and so forth.

Note that in the above description, determination is made in step S101 as to whether or not a standard target gamut has been specified but there may be cases wherein a gamut to serve as a target (goal) is defined beforehand.

For example, in the case that the image data is data of a still image, and the format is a bitmap (BMP) format or PNG format, an sRGB gamut becomes the target gamut. Also, for example, in the case that the image data is data of a moving image, and the image is SD (Standard-Definition), a BT601 gamut having the same width as the sRGB gamut becomes the target gamut, and in the case that the image is HD (High-Definition), a BT709 gamut having the same width as the sRGB gamut becomes the target gamut.

In the case that the image data format is defined beforehand as these formats, the gamut corresponding to the format is selected as the target gamut. That is to say, main compression is performed with the gamut thereof (sRGB gamut, BT601 gamut, BT709 gamut and so forth) serving as the standard target gamut. That is to say, in this case, the determining processing in step S101 is omitted, and the processing in steps S102 and S103 is performed.

Also, a gamut to serve as a target (goal) may be defined by a photography mode, for example. For example, in the case that the mode at the time of imaging by the imaging unit 201 is a standard mode, the target gamut may be set as an sRGB gamut. In this case, the sRGB gamut is selected as the target gamut at the point wherein the user selects the standard mode at time of imaging. That is to say, main compression is performed with the sRGB gamut serving as the standard target gamut. That is to say, in this case, the determining processing in step S101 is omitted, and the processing in steps S102 and S103 are performed.

Figures 6A, 6B:
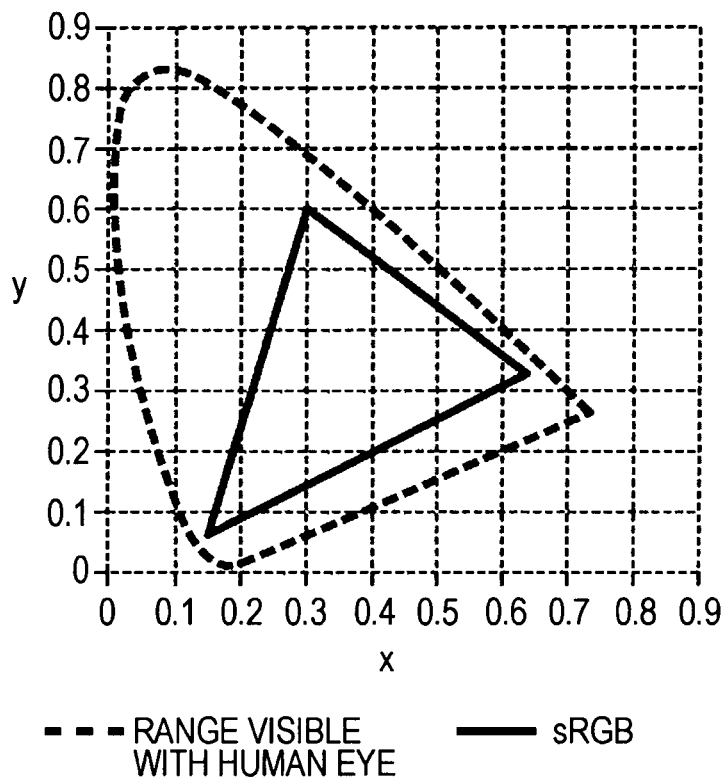
FIGS. 6A and 7A are diagrams illustrating an example of a format of chromaticity information.
Figure 7A:
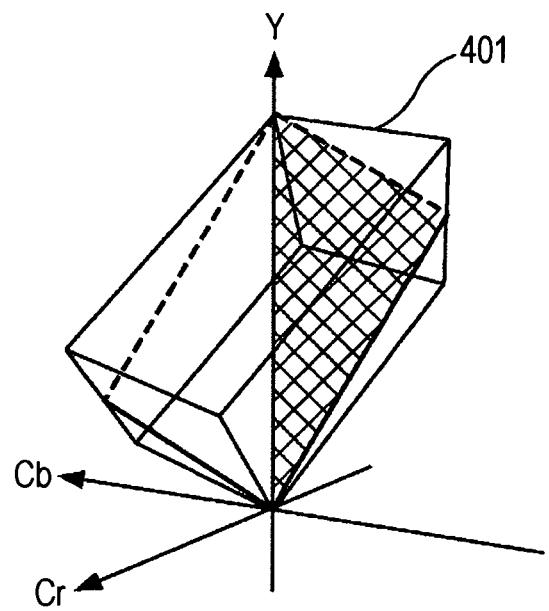

Next, an overview of the gamut conversion will be described. FIGS. 6A and 7A are diagrams showing an example of a chromaticity information format.

Let us say that the still image that is imaged with the digital still camera 101 is recorded in a brightness/color difference signal space called sYCC color space. sYCC is a color space for still image recording which is established by the IEC (International Electrotechnical Commission) and which is an international standard defined as IEC 61966-2-1AMD (support documentation to sRGB). sYCC can record more than 95 colors which humans can identify, and has a sufficient gamut to record the colors that a consumer-use digital still camera can detect. With this embodiment, the recording picture content is a still image and the recording device gamut information is sYCC.

A first gamut conversion is performed at the time of hard disk recording. The temporary output device gamut of this compression is in sRGB space, and the chromaticity information thereof is as shown in the graph in FIG. 6A and the table in FIG. 6B. sRGB (Standard RGB) is a color space standardized by IEC as colors on a standard display that is observed under certain standard viewing environments. This is a still image recording color space which has become the international standard definition of IEC 61966-2-1.

Figure 7B:
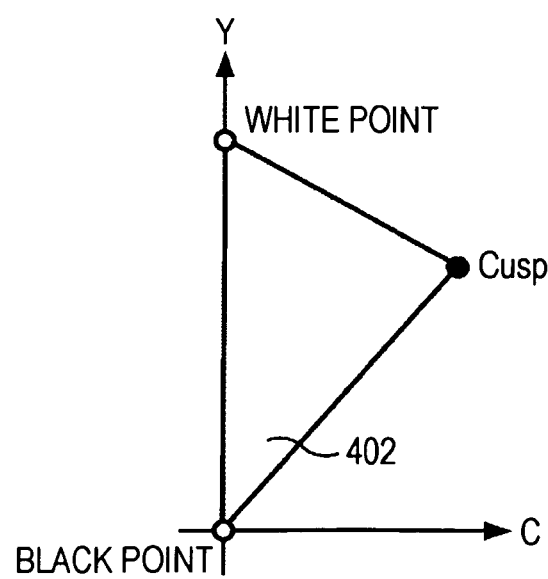

When the gamut of a certain device is expressed in YCC (Y, Cb, Cr) space (gamut 401) as shown in FIG. 7A, the cross-sectional plane that is cut on the same hue plane can be expressed with a YC two-dimensional plane wherein the vertical axis is brightness Y and the horizontal axis is saturation C, as shown in FIG. 7B (gamut 402). The gamut shape on this plane can resemble a triangle connecting a white point, black point, and Cusp point, as with the gamut 402 shown in FIG. 7B, as long as the YC coordinates of the maximum saturation point is known. Using this feature, the gamut 401 of the device can be closely defined if the YC coordinates (Cusp information) of the Cusp points at several representative hue faces (H) and held as a numerical value table. Such a table of YC coordinates (Cusp information) of maximum saturation points (Cusp) of representative hues is called a Cusp table.

Figure 8:
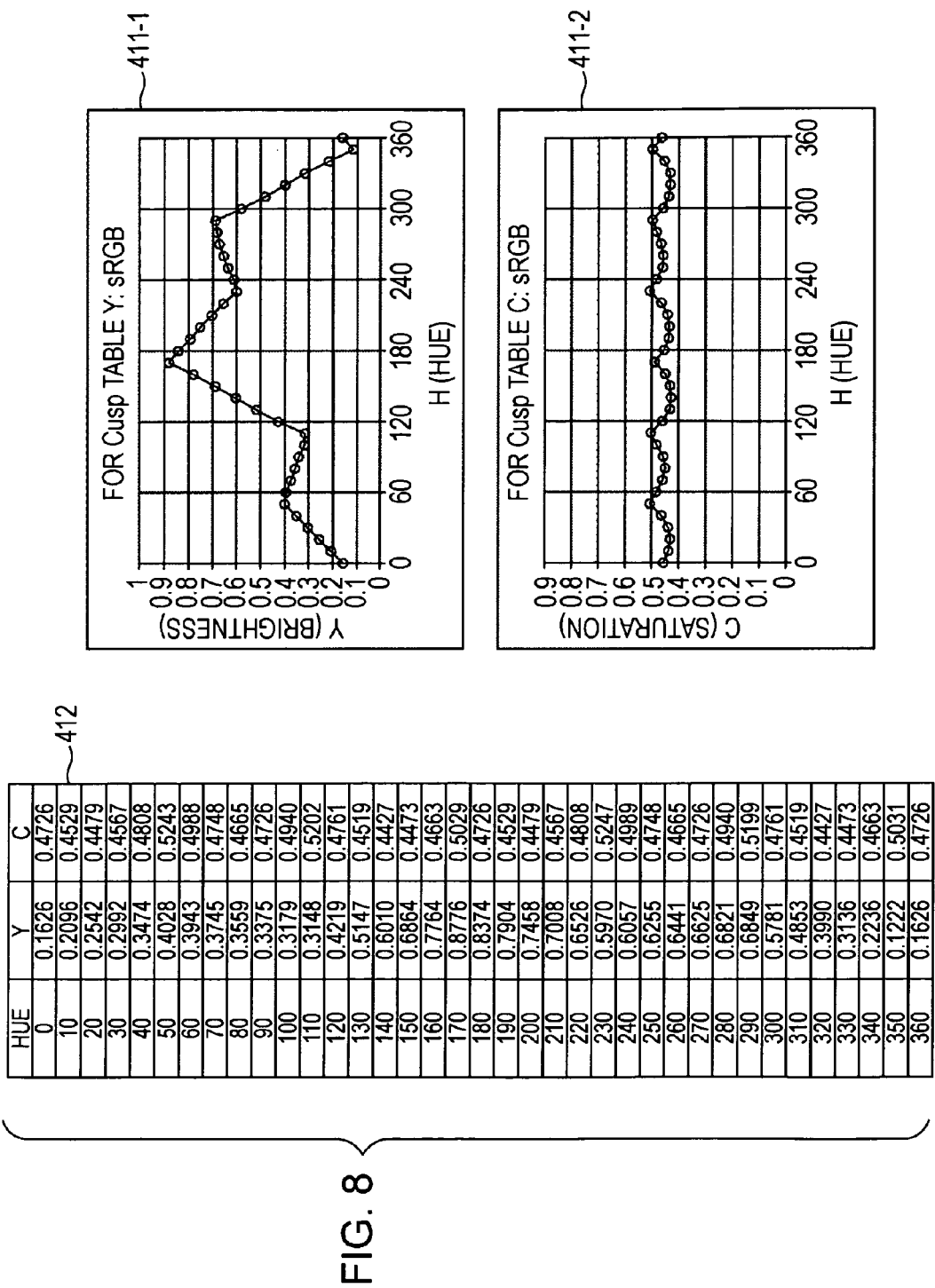
FIG. 8 is a diagram illustrating an example of a Cusp table.

FIG. 8 is a diagram showing an example of the Cusp table. A graph 411-1 is a graphical representation of the brightness (Y) of the Cusp point for each hue (H). A graph 411-2 is a graphical representation of the saturation (C) of the Cusp point for each hue (H). Also, the table 412 is a table of the values of the brightness (Y) and saturation (C) of the representative hues (H). The brightness and saturation between the representative hues (intermediate hues) can be readily obtained by performing interpolation processing using the values in the table 412, so the graphs 411-1 and 411-2 and the table 412 have information of roughly the same values. Thus, the Cusp table only has to show the YC coordinates of the Cusp points for at least each representative hue, and the format thereof can be optional.

[Gamut Conversion]

The gamut conversion processing unit 204 uses a Cusp table such as described above to perform gamut conversion (main compression or temporary compression). Details of the gamut conversion processing will be described below.

Figure 9:
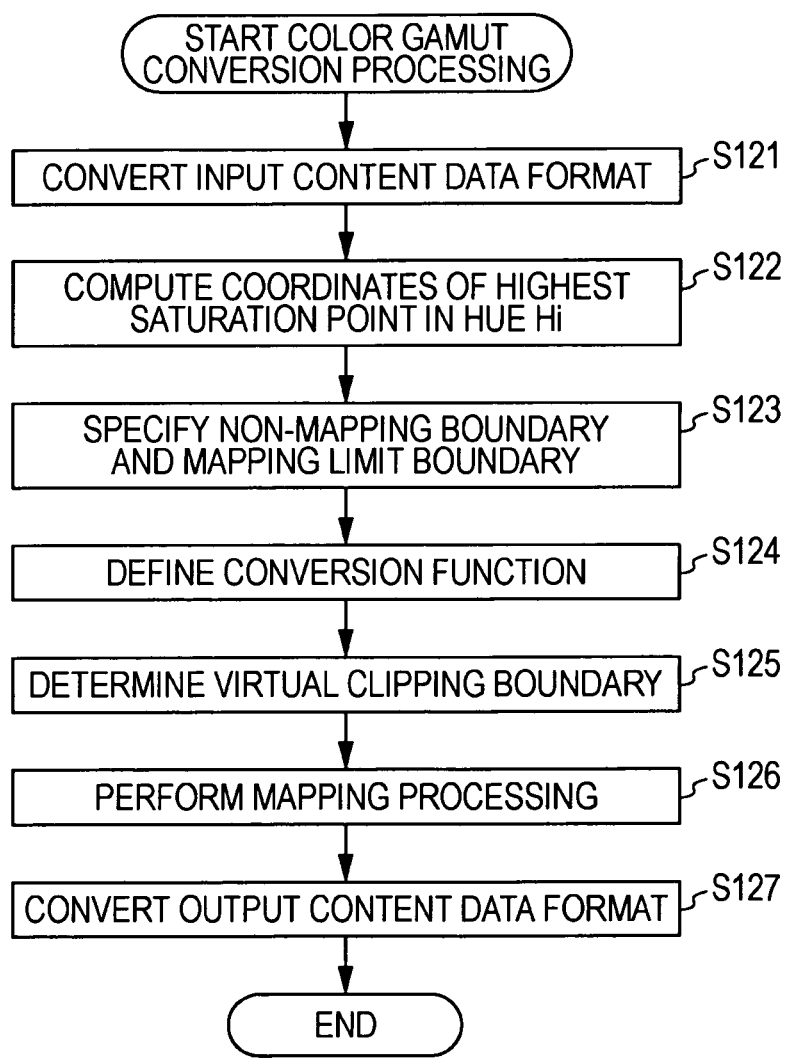
FIG. 9 is a flowchart describing an example of a gamut conversion processing flow.

An example of the flow of gamut conversion processing will be described with reference to the flowchart in FIG. 9. Description will be given with reference to FIGS. 10 through 16, as appropriate.

Upon the gamut conversion processing beginning, in step S121 the gamut conversion processing unit 204 performs calculations such as the Expressions (1) through (3) below, for example, so that . . . does not occur from the gamut conversion, and converts the input content data format from YCC (Yi, Cbi, Cri) to YCH (Yi, Ci, Hi) (the coordinate system is converted from the YCC coordinates to the YCH coordinates).

$$Yi = Yi \quad (1)$$

$$Ci = \sqrt{Cbi^2 + Cri^2} \quad (2)$$

$$\begin{cases} \text{if } Cri > 0 \\ Hi = \arctan\left(\frac{Cri}{Cbi}\right) \cdot \frac{180}{\pi} \\ \text{else} \\ Hi = \arctan\left(\frac{Cri}{Cbi}\right) \cdot \frac{180}{\pi} + 360 \end{cases} \quad (3)$$

Upon the format having been converted, in step S122 the gamut conversion processing unit 204 computes YC coordinate information (Ycp, Ccp) of the maximum saturation point (Cusp point) for each hue Hi, of the gamut to be the target. Note that the target gamut is defined at the point in time that the gamut conversion processing is started (i.e. also has the information of the gamut thereof), whereby the YC coordinate information of the Cusp point can be obtained from the target gamut information (e.g. YCC data).

In step S123, the gamut conversion processing unit 204 specifies a non-mapping boundary and a mapping limit boundary.

Figure 10:
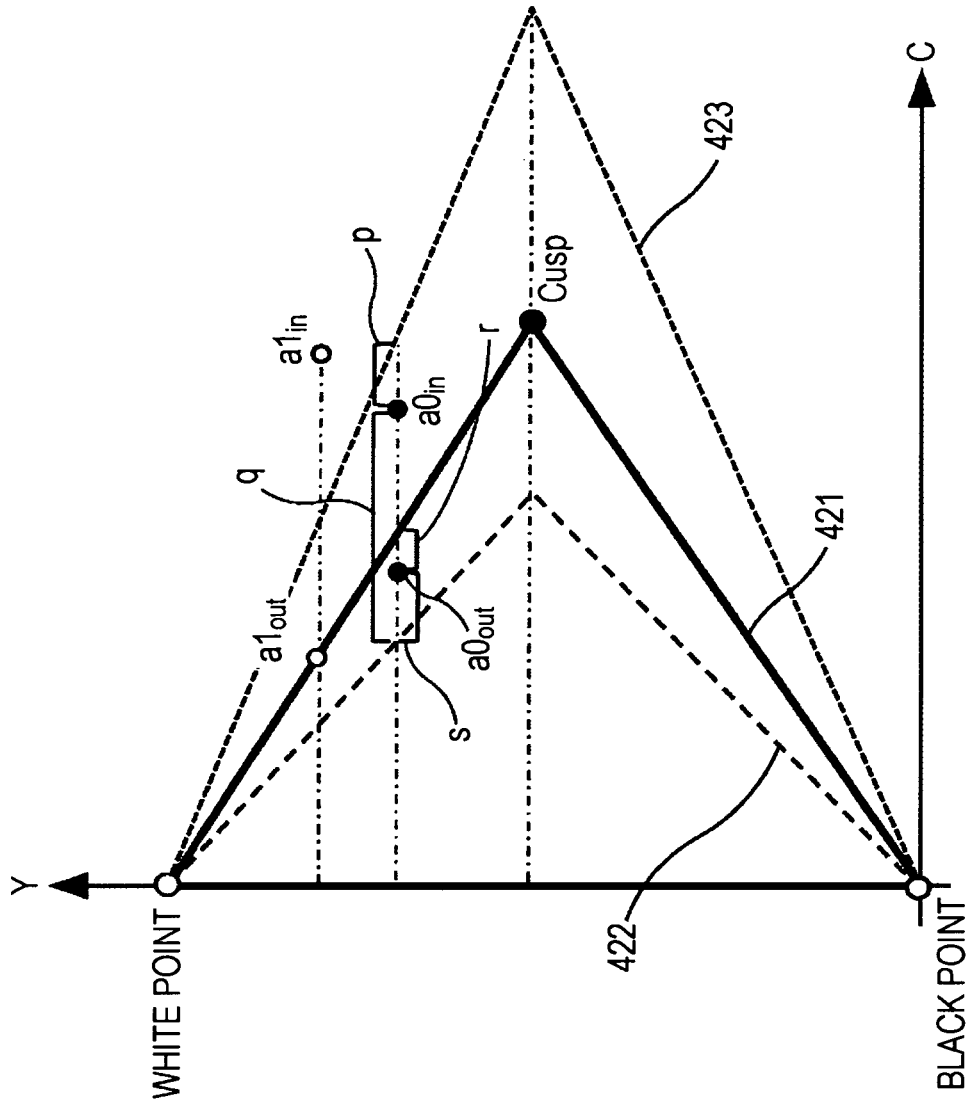
FIG. 10 is a diagram illustrating an example of a state of gamut conversion.

FIG. 10 is a diagram showing an example of a state of gamut conversion. In FIG. 10, the region surrounded with a bold line (the region surrounded by a triangle, wherein a white point, black point, and Cusp point are apexes) is the final conversion destination region (Target compressed area), i.e. the target gamut. A T-boundary (Target boundary) 421 is a border (boundary) of the target region that is other than the Y-axis. Using the T-boundary 421 as standard, the boundary line that is smaller slightly in the direction of saturation is the non-mapping boundary (U-boundary (Uncompressed boundary)) 422. The region surrounded by the Y-axis and the U-boundary 422 is the non-mapping region, and the pixels included therein are not subjected to gamut conversion (coordinate moving). Next, how much of the region will be converted to the conversion destination region has to be specified. A boundary line to specify how much of the color of the picture content is spread to the gamut is a mapping limit boundary (L-boundary (Limited boundary)) 423. The L-boundary 423 becomes a boundary line that is expanded in the saturation direction more than the T-boundary 421 in the gamut conversion. That is to say, gamut conversion means to compress the region surrounded by the U-boundary 422 and L-boundary 423 into the region surrounded by the U-boundary 422 and T-boundary 421.

Expressing only regarding the saturation direction, this gamut conversion herein moves the coordinates of a0in of FIG. 10 to a0out, for example. Note that colors having higher saturation than L-boundary 423 are all clipped to the T-boundary 421 (coordinates moved to T-boundary 421). For example, the coordinates of a1in in FIG. 10 are moved to a1out.

Figure 11:
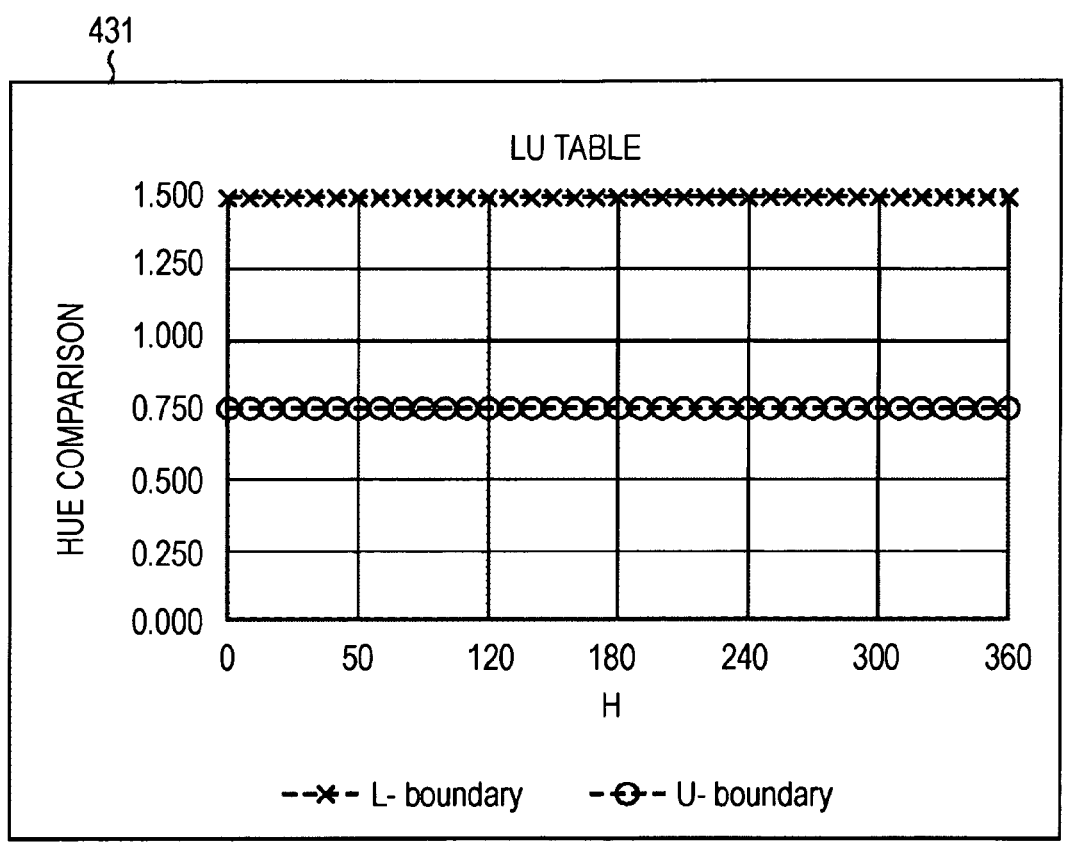
FIG. 11 is a diagram illustrating an example of an LU table.

FIG. 11 is a diagram showing an example of an LU table. The LU table 431 shown in FIG. 11 is table information expressed for each hue, by a ratio of the saturation (saturation ratio) of the specified non-mapping boundary (U-boundary 422) and mapping limited boundary (L-boundary 423), using T-boundary 421 as standard. In FIG. 11, the saturation ratio of the L-boundary and U-boundary in all hues are fixed (L-boundary as 1.5 and U-boundary as 0.75), but the values, herein may be changed for each hue (H).

The determining method for the saturation ratio of the L-boundary and U-boundary is optional. For example, the LU table 431 as shown in FIG. 11 may be held by the gamut conversion processing unit 204 beforehand, or may be obtained from the outside.

Returning to FIG. 9, in step S124 the gamut conversion processing unit 204 defines a conversion coefficient.

Figure 12:
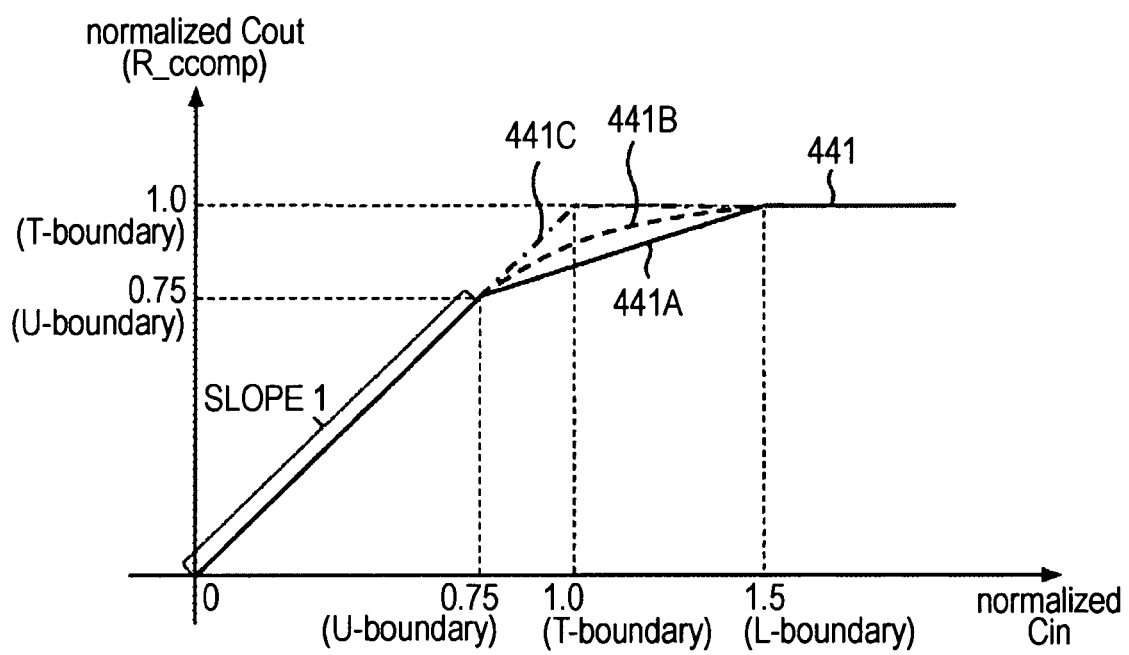
FIG. 12 is a diagram illustrating an example of a conversion function.

When the saturation ratio of the U-boundary 422 is "0.75" and the saturation ratio of the L-boundary 423 is "1.5", the state of compression can be expressed with a function as the curve 441 shown in FIG. 12, for example. This curve 441 is called a "mapping function". The range of the slope being "1" shows the non-mapping region. The gamut conversion shows that the range surrounded by the U-boundary 422 and L-boundary 423 on the horizontal axis is compressed into the range surrounded by the U-boundary 422 and T-boundary 421 of the vertical axis. The conversion method at this time is optional and can be various methods. For example, the solid line 441A means linear compression. The broken line 441B is an example of smoothly bending the function so as to gradually compress. The dotted-broken like 441C is not compression, but indicates color-gamut clipping to the T-boundary 421.

That is to say, with the shape of the curve 441 in this range, for example in FIG. 10, the ratio (r:s) is determined of the distance to T-boundary 421 and the distance to U-boundary 422 of a0out, which is the movement destination of a0in wherein the ratio of distance to L-boundary 423 and the distance to U-boundary 422 is p:q. In other words, the function shown with the curve 441 (conversion function) shows the compression rate (R_ccomp) in the saturation direction of a certain pixel to be processed, and from the output value of this function a virtual clipping boundary of the pixel to be processed is determined.

The mapping function is determined dependent upon the values of the L-boundary 423 and U-boundary 422, so if the values of the L-boundary 423 and U-boundary 422 change with every hue, the mapping functions also change.

Figure 13:
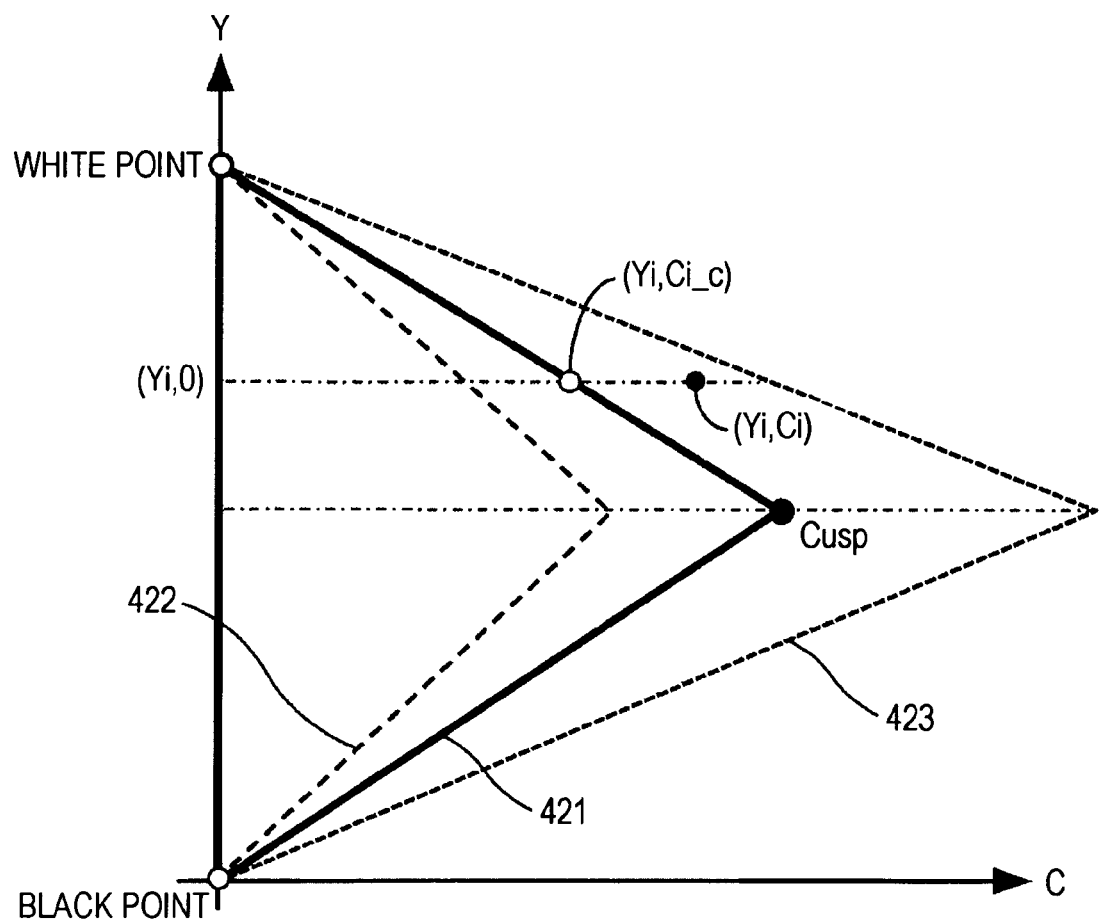
FIG. 13 is a diagram illustrating an example of a saturation computing method.

Returning to FIG. 9, in step S125 the gamut conversion processing unit 204 determines the virtual clipping boundary. The gamut conversion processing unit 204 uses the saturation Ci of the pixel to be processed, and references the conversion function defined in the processing of step S124. However, the conversion function is a value of which the saturation at the T-boundary 421 is normalized as "1", so the saturation Ci_c at T-boundary 421 of the same brightness as the pixel to be processed has to be found. If we say that the YC coordinates of the pixel to be processed are (Yi, Ci), as shown in FIG. 13 for example, the saturation Ci_c at the T-boundary 421 of the same brightness as the pixel to be processed can be found as the saturation at the intersection between a line linking the white point and Cusp point and a line linking the pixel to be processed (Yi, Ci) and the brightness point (Yi, 0) of the pixel to be processed on the Y-axis.

Using the saturation Ci_c of the intersection herein and the saturation Ci of the pixel to be processed, the saturation Ci_norm for referencing the conversion function can be calculated as in the Expression (4) below.

$$Ci\_norm = \frac{Ci}{Ci\_c} \quad (4)$$

For example, the gamut conversion processing unit 204 uses the saturation Ci_norm to reference the conversion function shown by the curve 441 in FIG. 12, and determines the saturation direction compression rate R_ccomp of the pixel to be processed. Upon the R_ccomp having been determined, a virtual clip boundary (V-boundary) of the pixel to be processed can be determined. Thus, by determining the virtual clip boundary (V-boundary), the gamut conversion can be considered as processing to repeatedly perform gamut clipping as to the virtual clip boundary.

Figure 14A:
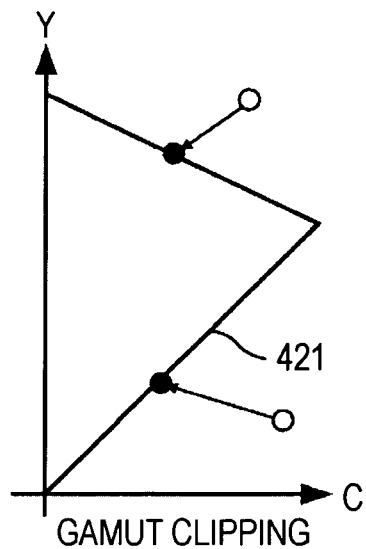
FIGS. 14A and 14B are diagrams comparing the states of gamut clipping and gamut conversion.
Figure 14B:
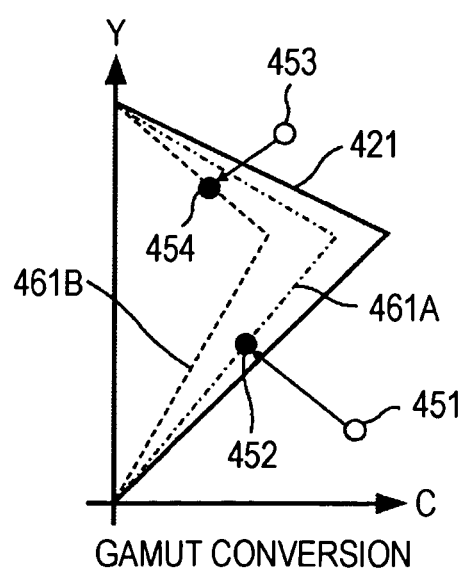
Figure 15:
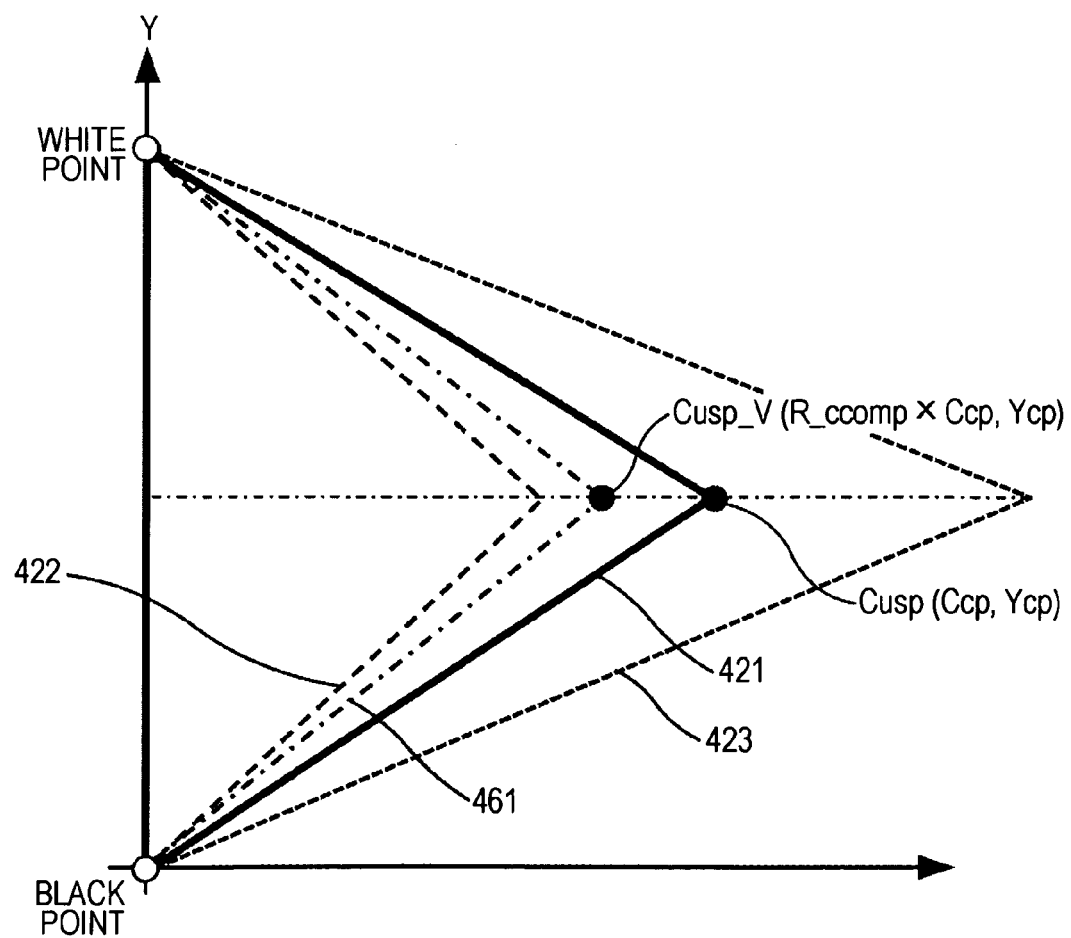
FIG. 15 is a diagram illustrating a virtual clipping boundary.

FIGS. 14A and 14B are diagrams to compare a state of gamut clipping and gamut conversion. FIG. 14A is a schematic diagram showing a state of gamut clipping. Gamut clipping indicates moving a color which is outside the target gamut onto the T-boundary 421 which is the target gamut boundary (clip to T-boundary 421), as shown in FIG. 14A. For example, in FIG. 14A, the pixel to be processed which is indicated by a white circle is moved to the coordinates of the clip point on the T-boundary 421 which is indicated by a black circle.

FIG. 14B is a schematic diagram showing a state of gamut conversion. As described below, gamut conversion indicates moving a pixel to be processed onto a virtual clip boundary (V-boundary) corresponding to the pixel thereof to be processed. For example, in FIG. 14B, the coordinates of the pixel to be processed 451 are moved to the clip point 452 on the V-boundary 461A, and the coordinates of the pixel to be processed 453 are moved to the clip point 454 on the V-boundary 461B. That is to say, the gamut conversion can have the same value has performing similar processing as in the case of the gamut clipping in FIG. 14A for each pixel to be processed.

For example, to describe the Cusp point, the YC coordinates (Ycp, Ccp_V) of the clip point Cusp_V of the Cusp point of the YC coordinates (Ycp, Ccp) can be computed with the Expression (5) below, using the saturation direction compression rate R_ccomp.

$$Cusp\_V=(Ccp\_V, Ycp)=(R\_ccomp \times Ccp, Ycp) \quad (5)$$

The virtual clip boundary (V-boundary) 461 is determined from the YC coordinates of the clip point Cusp_V. For example, the virtual clip boundary (V-boundary) 461 of the Cusp point is made up of a line segment having the clip point Cusp_V and the white point as the ends thereof, and a line segment having the clip point Cusp_V and the black point as the ends thereof.

That is to say, the V-boundary 461 is determined by the above-described conversion function and the ratio (p:q) of the distance to the L-boundary 423 of the pixel to be processed and the distance to the U-boundary 422. In other words, pixels to be processed of which the ratio (p:q) of the distance to the L-boundary 423 of the pixel to be processed and the distance to the U-boundary 422 are the same share the V-boundary 461.

Returning to FIG. 9, in step S126 the gamut conversion processing unit 204 performs mapping processing.

Figure 16:
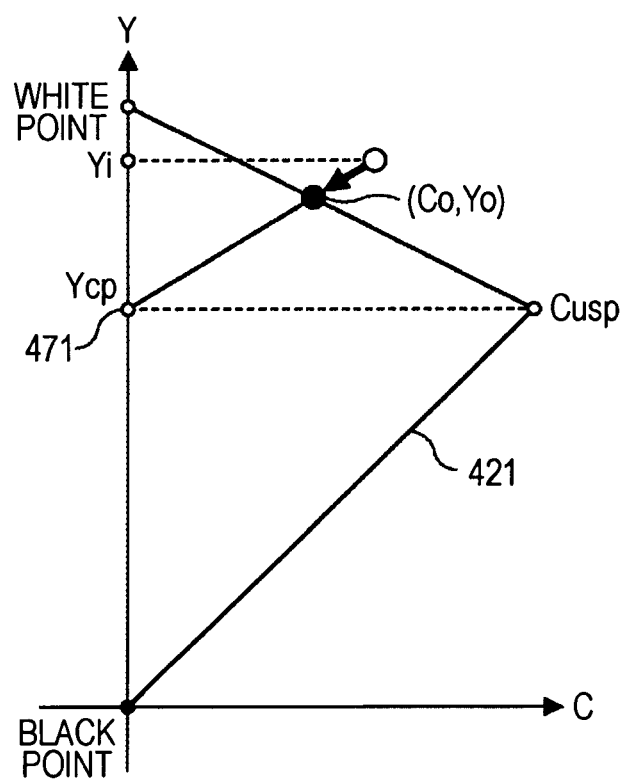
FIG. 16 is a diagram illustrating an example of the state of gamut conversion mapping.

FIG. 16 is a diagram showing an example of a state of gamut conversion mapping. The mapping is performed in such a way that, as shown in FIG. 16 for example, a convergence point in the clipping direction is set on the Y-axis and mapping is performed in the direction facing the convergence point thereof on the virtual clip boundary (V-boundary) 461.

In the case of the example in FIG. 16, a point having the same brightness as the brightness Ycp of the Cusp on the Y-axis is set as the convergence point, and mapping is performed in the direction facing the convergence point thereof (arrow).

It goes without saying that which position to clip to on the virtual clip boundary (V-boundary) 461 is optional, and the position of the convergence point is also optional. Also, multiple convergence points may be set. In this case, for example, mapping is performed in the direction wherein the directions facing each convergence point are synthesized with a predetermined ratio. This kind of clipping determines a final mapping point (Co, Yo).

Returning to FIG. 9, in step S127 the gamut conversion processing unit 204 converts the output content data format. If we say that the CY coordinates of the final mapping point obtained by the processing in step S126 is (Co, Yo), the gamut conversion processing unit 204 performs conversion from the YCH coordinate system to the YCC coordinate system as in the Expressions (6) through (8) below, and the YCC coordinates Pout (Yo, Cbo, Cro) of the final mapping point are calculated.

$$Ho=Hi$$

and accordingly $$Yo=Yo \quad (6)$$

$$Cbo = Co \cdot \cos(Ho) \tag{7}$$

$$Cro = Co \cdot \sin(Ho) \tag{8}$$

Upon the YCC coordinates of the final mapping point having been computed, the gamut conversion processing is ended.

[Metadata]

Gamut metadata is made up of data showing a range subject to gamut conversion. For example, a Cusp table (graphs 411-1 and 411-2 or table 412) such as shown in FIG. 8 is appended to the image data that has been gamut converted as gamut metadata.

Also, the restoring metadata generated by the restoring metadata generating unit 205 may include any data as long as the data is referenced in the event of restoring processing, and for example, has the following three types of data.

A first type of data is data showing the range to be subjected to gamut conversion. An example is the LU table 431 shown in FIG. 11. That is to say, by referencing the LU table 431, how widely the data before gamut conversion has spread, or where the data region is that has not yet been gamut converted, can be confirmed. Note that the format of the LU table 431 is optional. For example, the saturation rate of the L-boundary and U-boundary of each representative but (e.g. 10 degrees each) may be compiled into a table. In this case, the saturation rate of the L-boundary and U-boundary of the intermediate hues between representative hues may be computed by performing interpolating processing using the saturation rate of the L-boundary and U-boundary of the intermediate hues.

Figures 17A, 17B:
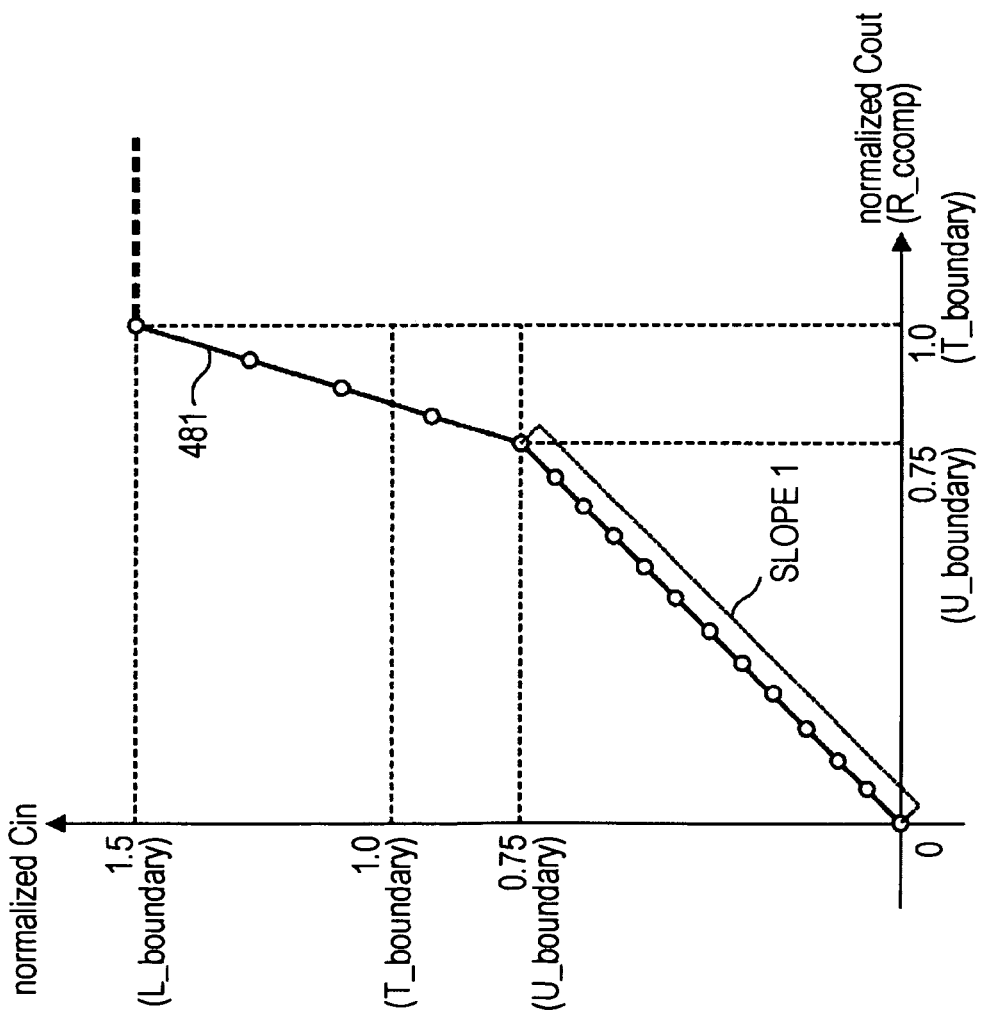
FIGS. 17A and 17B are diagrams illustrating an example of a restoring function.

A second type of data is data showing the degree of gamut conversion (restoring). An example is an inverse function (reconstructing function) of the gamut conversion function shown in FIG. 12. FIGS. 17A and 17B are diagrams showing an example of the reconstructing function. FIG. 17A shows the reconstructing function with a graph, and FIG. 17B shows the reconstructing function with a table of representative points.

The curve 481 in the graph shown in FIG. 17A is an inverse function of the curve 441 in FIG. 12 (in the case of solid line 441A), within the range of 0 through T-boundary on the horizontal axis (normalized Cout) (the range of 0 through L-boundary on the vertical axis (normalized Cin)).

However, points at the portion greater than the T-boundary of the horizontal axis are clipped to the T-boundary in the event of gamut conversion processing, and therefore are not restorable. Accordingly, the curve 481 which is the restoring function in FIG. 17A does not include the portions greater than the T-boundary.

The table 482 in FIG. 17B is a table of the values of the vertical axis (normalized Cin) for the representative points on the curve 481 in FIG. A (distance data with input (normalized Cout (R_ccomp)) in width increments of 0.0625). Intermediate points not in the table can be found by an interpolating processing, so the table 482 can be considered to have the same values as the curve 481 shown in FIG. 17A.

Thus, the restoring function shows the pixels of which portion are compressed or decompressed to what degree. The format of the data showing the restoring function is optional, and for example may be in a numerical expression or the like, besides the above description.

Figure 18:
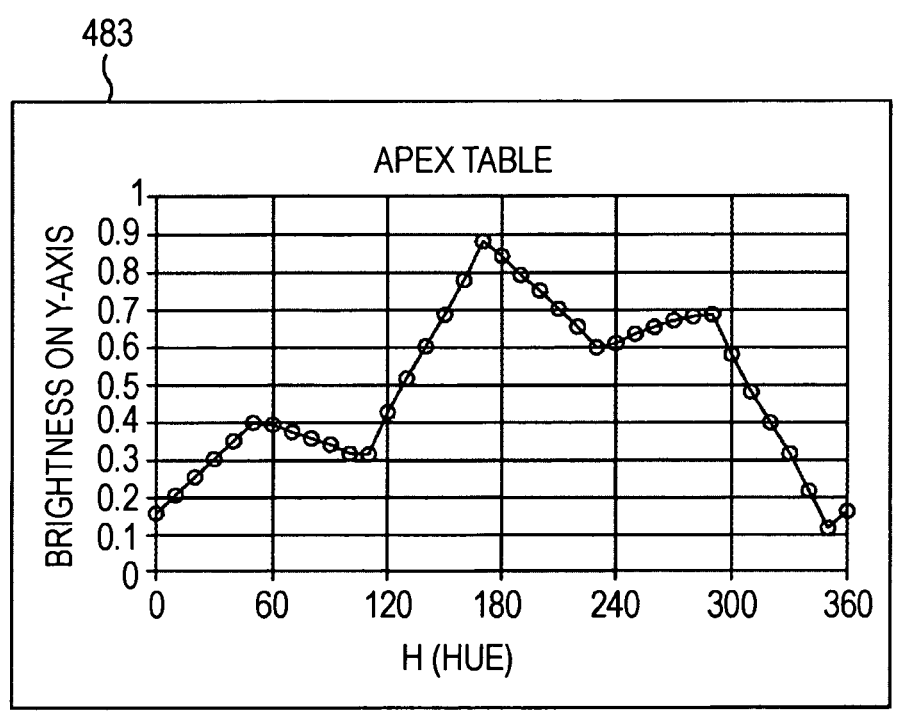
FIG. 18 is a diagram illustrating an example of a convergence point table.

A third type of data is data showing the direction of gamut conversion (restoring). An example may be a convergence point table used in the event of gamut conversion. The description above indicates that the convergence point for each hue is at a point on the Y-axis of the brightness Ycp of the Cusp for each hue. Accordingly, in this case, for example as shown in FIG. 18, the convergence table is the same as the table for the Cusp brightness Ycp.

It goes without saying that the convergence point can be set at an optional point, so the convergence point table is set independently, and is not necessarily the same as the table for the Cusp brightness Ycp.

Also, the format for the convergence point table is optional as with the restoring function and LU table, and can be expressed in any format such as a graph, table of representative points, numerical expression, or the like.

[Recording Format]

The image data subjected to gamut conversion as shown above is saved as a 16-bit data length image in a Tiff file format, for example. In this case, the gamut metadata or restoring metadata having data such as described above is buried in the image data as a Tiff "Private Tag", for example.

FIG. 19 is a diagram showing an example of a recording format in the gamut metadata. The gamut metadata can prepare a Tag in the Tiff file "Private Tag" as "GamutMeta", for example, and store this in the "GamutMeta Tag".

The "Directory Entry" of the Tiff of the "GamutMeta Tag" is configured as shown on the left hand portion of FIG. 19. The type of variable making up the Tag is set at "7" indicating "Undefined". Regarding the number of variables, Y and C each have a Cusp information table, so "2" is set. If the offset address to "Value" stored in the actual table is "α", the "Value" becomes as shown on the right hand portion of FIG. 19. In the example in FIG. 19, the Cusp table for each of Y and C are defined in the table of 37 increments at 10° hues.

Figure 20:
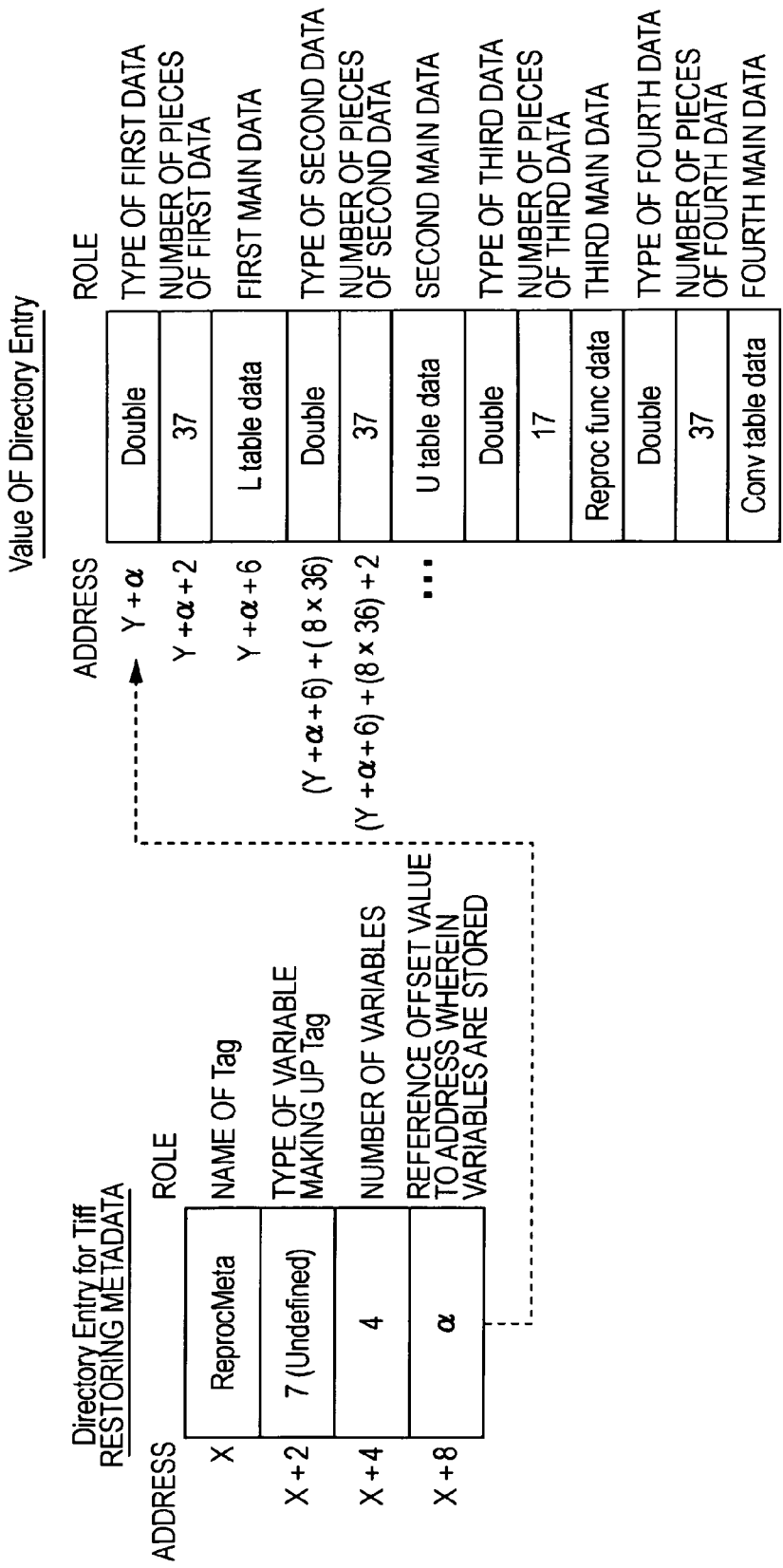
FIG. 20 is a diagram illustrating an example of a recording format for restoring metadata.

FIG. 20 is a diagram showing an example of a recording format in the restoring data. The restoring metadata can prepare a Tag called "ReprocMeta" in the Tiff "Private Tag", and store this in the "ReprocMeta Tag".

The "Directory Entry" of the Tiff of the "ReprocMeta Tag" is configured as shown on the left hand portion of FIG. 20. In this case also, the type of variable making up the Tag is set at "7" indicating "Undefined". However, regarding the number of variables, the types of restoring metadata is the two types of LU tables, the restoring function, and convergence point table, for a total of four types, so "4" is set. If the offset address to "Value" stored in the actual table is "α", the "Value" becomes as shown on the right hand portion of FIG. 20.

In the example in FIG. 20, the two types of tables (L table data and U table data) of the L-boundary and U-boundary and the convergence point table (Cony table data) are defined in 37 double-form tables in increments of 10°. Also, the restoring function (Reproc func data) is defined in 17 double-form tables in increments of 0.0625.

In the case of a Tiff format, the image data and metadata each are recorded on the optical disk 110 with a format such as described above. Of course, the storing locations for the image data and metadata are optional, and may be in locations other than those described above. Also, the image data format may be other than Tiff.

[Processing at Time of Playing]

Next, processing in the event of playing the image data recorded in the optical disk 110 as shown above will be described. In the event of reading image data from the optical disk 110, the digital still camera 101-2 performs time-of-playing determining processing, and performs restoring and conversion of the gamut. An example of time-of-playing determining processing flow will be described with reference to the flowchart in FIG. 21.

Upon the time-of-playing determining processing having been started, in step S201 the playing unit 301 reads the image data to be played and the metadata thereof from the optical disk 110. In step S202, the conversion state determining unit 302 determines whether the image data to be played (the playing data) is temporarily compressed (temporary compression data) or main-compressed (main compression data), based on various types of information such as the image data header information, flag information, gamut metadata, or restoring metadata and so forth.

In step S203, the restoring conversion processing unit 304 executes restoring conversion processing to perform restoring processing and gamut conversion processing according to the gamut conversion state and so forth, based on the determination results from the conversion state determining unit 302 and the gamut information of the display unit 305 that the gamut information storage unit 303 stores. Upon the restoring conversion processing ending, the time-of-playing determining processing is ended.

Note that in the case of displaying the image on the monitor 102, the digital still camera 101-2 obtains gamut information of the monitor 102 via HDMI beforehand. In this case, during the negotiation at the time of connection, an exchange of connection information is made using EDID (Extended Display Identification Data). Thus, the digital still camera 101-2 can obtain the gamut information of the monitor 102 at the time of connection with the monitor 102.

Figure 22:
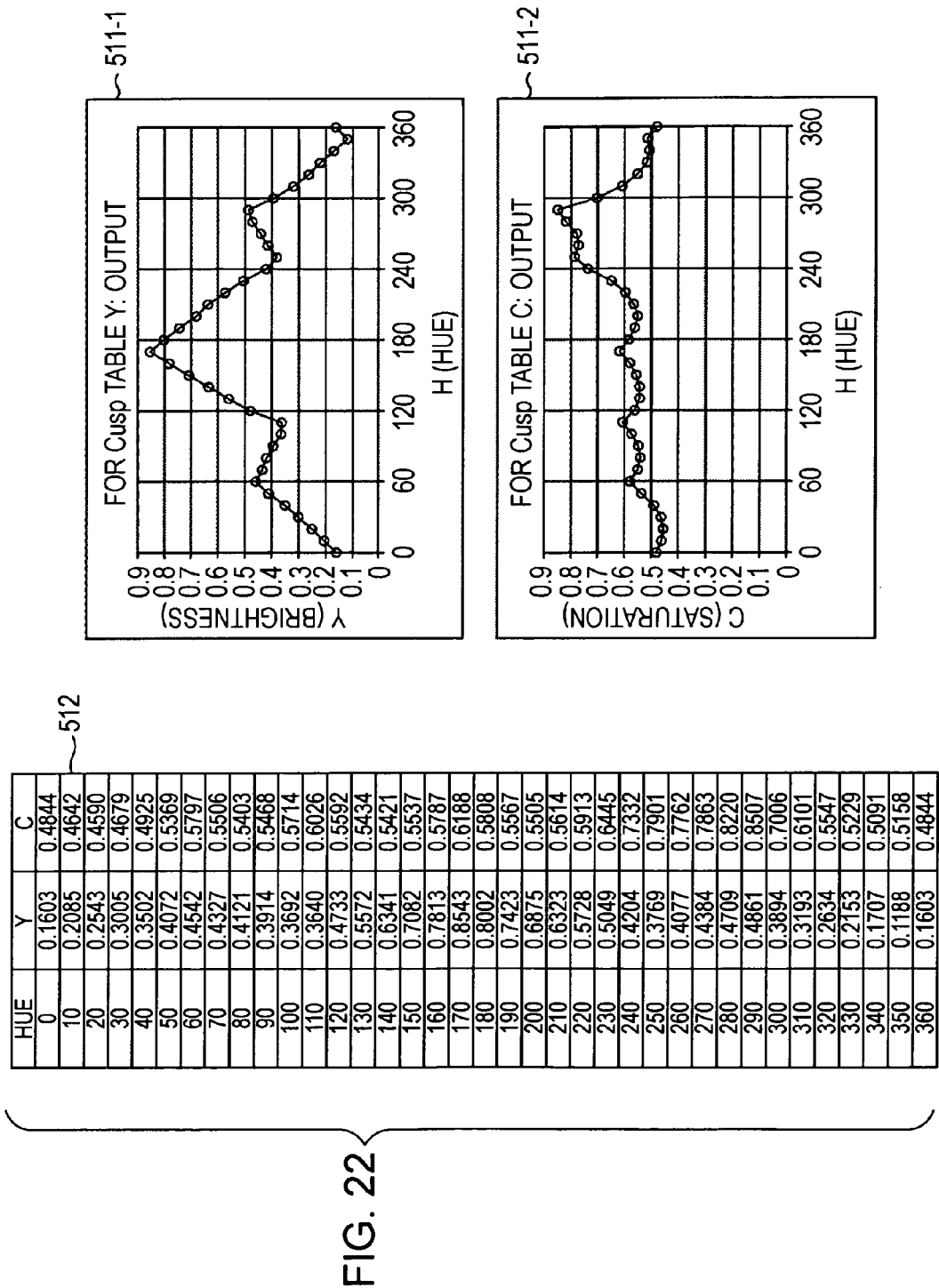
FIG. 22 is a diagram illustrating an example of a gamut of an output device.

The gamut information of the output device such as the monitor 102 and display unit 305 may be information in any format, and may be a Cusp table such as shown in FIG. 22, for example.

FIG. 22 is a diagram showing an example of the output device gamut. A graph 511-1 is a graphical representation of the brightness (Y) of the Cusp points for each hue (H). A graph 511-2 is a graphical representation of the saturation (C) of the Cusp points for each hue (H). Also, a table 512 is a table listing of the values of the brightness (Y) and saturation (C) for the representative hues (H). That is to say, similar to the case of FIG. 8, as long as the YC coordinates of the cusp points for at least each of the representative hues are shown, the format of the Cusp table is optional.

[Control of Restoring and Compression]

Figure 21:
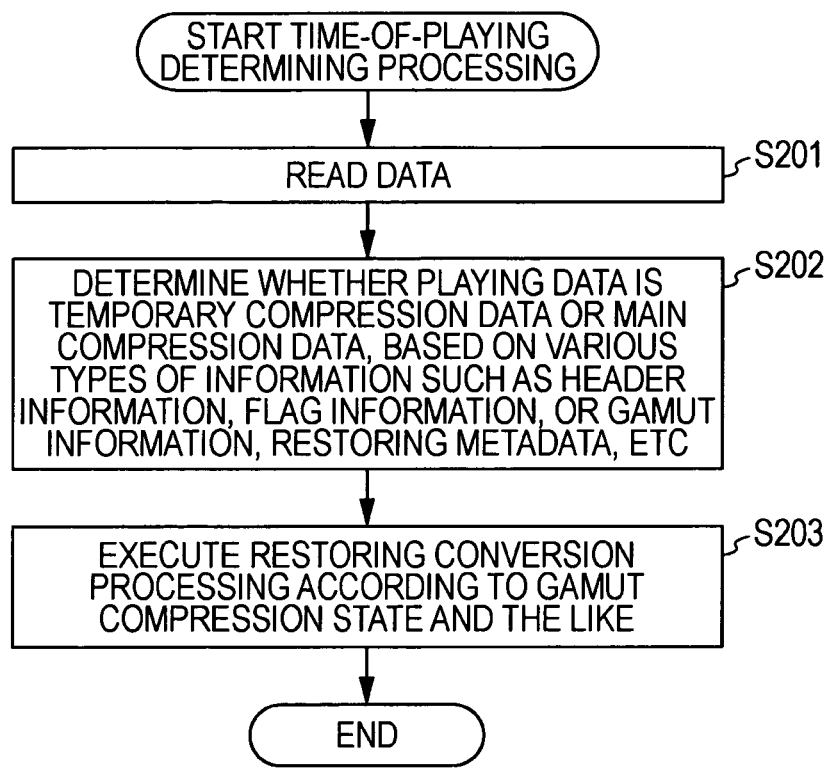
FIG. 21 is a flowchart describing an example of a time-of-playing determining processing flow.

The restoring conversion processing unit 304 executes the restoring processing and gamut conversion processing in step S203 of FIG. 21 as to the read image data. A detailed flow example of the restoring conversion processing will be described with reference to the flowchart in FIG. 23.

Upon the restoring conversion processing having been started, the control unit 311 of the restoring conversion processing 304 determines in step S221 whether or not the image data read out from the optical disk 110 is temporary compression data (temporarily compressed image data). In the case that the image data read from the optical disk 110 is temporary compression data, the flow is advanced to step S222. That is to say, in the case determination is made that the gamut of the image data is not the output gamut, control is performed to perform main compression.

In step S222, the control unit 311 computes the CY coordinates (Cs, Ys) of the cusp points in the gamut after temporary compression (e.g., sRGB) and the CY coordinates (Ct, Yt) of the cusp points in the gamut of the output device (output gamut) which is the final target gamut, for each hue Hi near 0°, from the respective gamut information. For example, the control unit 311 finds the CY coordinates (Cs, Ys) on the Cusp points in Hi from the Cusp table shown in FIG. 22, by performing interpolating processing as appropriate, and so forth. Also, the control unit 311 finds the CY coordinates (Ct, Yt) on the Cusp points in Hi from the Cusp table shown in FIG. 22, by performing interpolating processing as appropriate, and so forth.

Upon the CY coordinates of the cusp points having been computed, in step S223 the control unit 311 computes a determining index Cx. The determining index Cx is an index to determine whether or not there is a current gamut of the image data (image data gamut) exists in the output gamut, i.e. whether a portion wider than the gamut after temporary compression exists (e.g. sRGB).

Figure 24A:
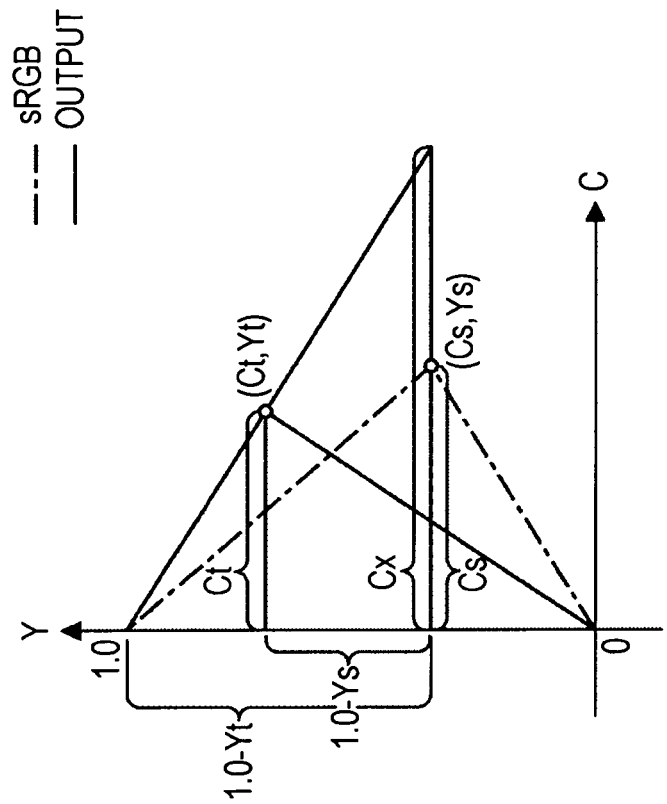
FIGS. 24A and 24B are diagrams illustrating an example of a gamut comparing method.
Figure 24B:
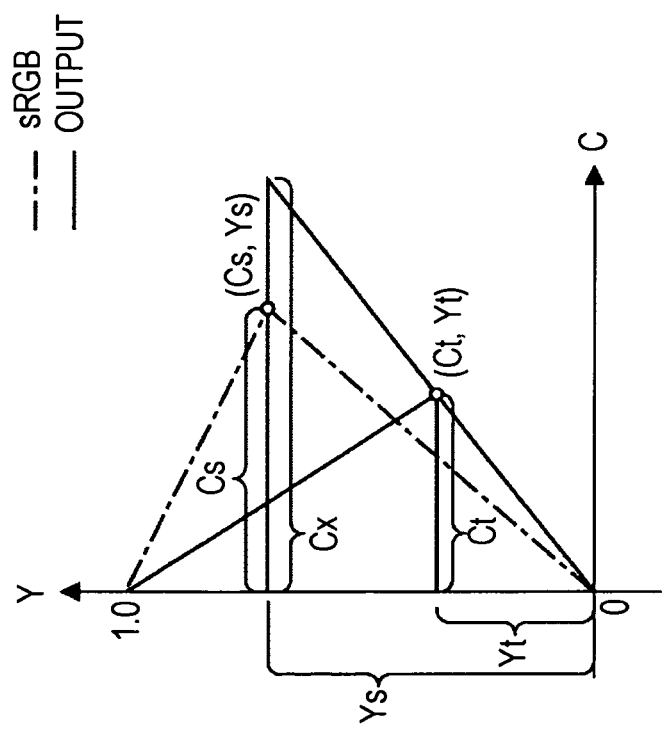

The comparison of the output gamut and image data gamut is performed as shown in FIGS. 24A and 24B, for example. That is to say, the comparison between the output gamut and the image data gamut is performed as shown in FIGS. 24A and 24B, for example. That is to say, for the hue Hi to be processed, whether or not a Cusp point of the output gamut exists outside the image data gamut is confirmed.

For example, as shown in FIG. 24A, in the case of Yt<Ys, the saturation value of a point, wherein the brightness value is Ys (the brightness value of the Cusp point of the image data gamut) on a straight line linking the black point (0, 0) and the Cusp point (Ct, Yt) of the output gamut, is called "determining index Cx". In this case, the determining index Cx is computed with the Expression (9) below.

$$Cx : Ct = Ys : Yt \qquad (9)$$
$$\therefore Cx = \frac{Ys}{Yt} Ct$$

Conversely, in the case of Yt≧Ys as shown in FIG. 24B, the saturation value of a point, wherein the brightness value is Ys (the brightness value of the Cusp point of the image data gamut) on a straight line linking the white point (0, 1) and the Cusp point (Ct, Yt) of the output gamut, is called "determining index Cx". In this case, the determining index Cx is computed with the Expression (10) below.

$$Cx : Ct = (1.0 - Ys) : (1.0 - Yt) \qquad (10)$$
$$\therefore Cx = \frac{(1.0 - Ys)}{(1.0 - Yt)} Ct$$

In the case that the saturation value Cx of the Cusp point of the image data gamut is smaller than the determining index Cx, the cusp point (Ct, Yt) of the output gamut is positioned outside the image data gamut. That is to say, the output gamut includes the range outside the image data gamut (a portion wider than the image data gamut exists outside the output gamut).

Returning to FIG. 23, the control unit 311 determines in step S224 whether or not the determining index Cx computed by Expressions (9) or (10) are at or below the saturation value Cs of the Cusp point. In the case determination is made that the determining index Cx is at or below the saturation value Cs, the flow is advanced to step S225. In this case, the control unit 311 determines that the Cusp point (Ct, Yt) of the output gamut is positioned within the image data gamut and a portion wider than the image data gamut does not exist in the output gamut.

In step S225, the control unit 311 switches the hue to be processed to the next hue (representative hue) by adding an interval ΔH between the representative hues to the hue to be processed Hi.

In step S226, the control unit determines whether or not the value of the hue to be processed Hi is 360 or greater, i.e. whether the image data gamut and output gamut have been compared for all hues.

In the case determination is made that the hue to be processed Hi is less than 360, and that an unprocessed hue exists which has not be subjected to comparison between the image data gamut and output gamut, the flow is returned to step S222. The processing in step S222 and thereafter is repeated as to the new hue to be processed Hi that is updated in step S225.

That is to say, the processing in steps S222 through S226 are repeated until determination is made in step S224 that the determining index Cx is greater than the saturation value Cs, or until determination is made in step S226 that a comparison of the image data gamut and the output gamut has been made for all of the hues (representative hues).

Figure 25:
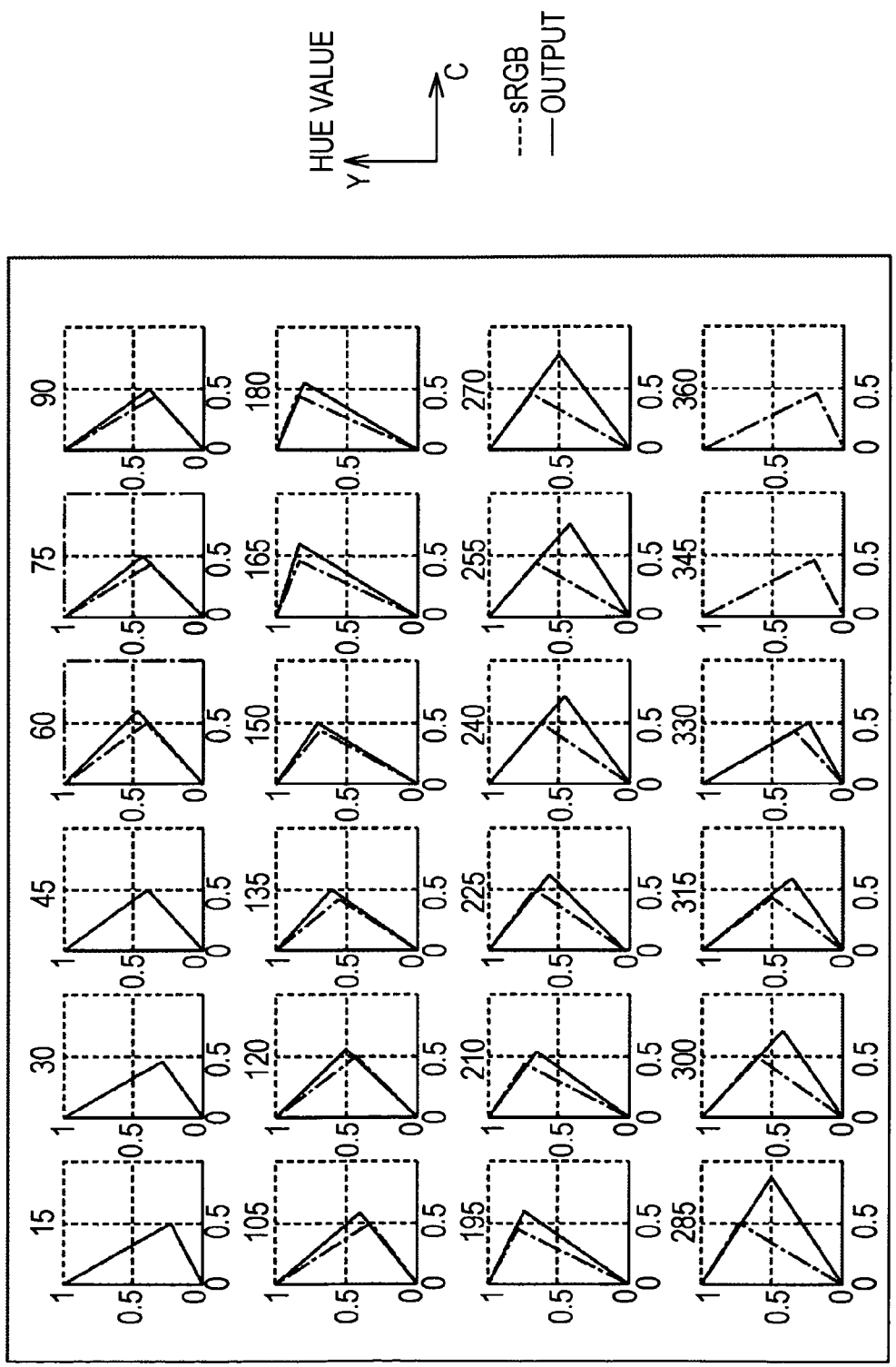
FIG. 25 is a diagram illustrating an example of gamut comparison results.

That is to say, as shown in FIG. 25, a comparison of the image data gamut and the output gamut is performed for at least all of the representative hues defined beforehand.

In the case determination is made in step S224 that the determining index Cx is greater than the saturation value Cs, the flow is advanced to step S227. In this case, the control unit 311 determines that a portion outside the image data gamut is included in the output gamut. The control unit 311 then causes the restoring processing unit 312 to execute restoring processing to restore the gamut before temporary compression.

In step S227, the restoring processing unit 312 performs restoring processing as to the temporary compression data, and restores the region between the L-boundary and U-boundary of the gamut before temporary compression. Upon the restoring processing having ended, the processing is advanced to step S228.

Also, in step S226, in the case determination is made that a comparison has been made between the image data gamut and the output gamut for all hues (representative hues), the flow is advanced to step S228 without performing restoring processing. In this case, the output gamut is determined to be completely included in the image data gamut (for all hues).

In either case, the image data gamut is in a state that can be converted to the output gamut by gamut conversion. In step S228, the gamut conversion processing unit 313 performs main compression of the image data gamut to the output gamut.

In step S229, the gamut conversion processing unit 313 outputs the main-compressed image data (main compression data) to the display unit 305, and ends the restoring conversion processing. The display unit 305 displays the image of the supplied main compression data on a screen 101A. Note that in the case of displaying the image on the monitor 102, the gamut conversion processing unit 313 supplies the main compression data to an unshown HDMI interface, and to a monitor 102 via an HDMI cable 103 connected to the HDMI interface. The monitor 102 displays the image of the supplied main compression data.

Also, in the case determination is made in step S221 that the image data read from the optical disk 110 is main compression data, the flow is advanced to step S229. In this case, in step S229 the control unit 311 outputs the main compression data to the display unit 305 without performing restoring processing or gamut conversion processing, and ends the restoring conversion processing.

By the control unit 311 controlling the execution of the restoring processing and gamut conversion processing as described above, the restoring processing and gamut conversion processing can be performed as appropriate. In the case of the example in FIG. 23, only in cases wherein the image data read from the optical disk 110 has been temporarily compressed does the control unit 311 perform main compression to the output gamut. Also, only in cases wherein a portion outside the gamut of the image data (the image data gamut) read from the optical disk 110 is included in the output gamut is the restoring processing performed.

That is to say, the digital still camera 101-2 determines whether to perform gamut conversion to a target gamut after performing restoring processing, or to perform gamut conversion to a target gamut without performing restoring processing, according to the relation between the gamut of the image subjected to gamut conversion beforehand and the target gamut, and executes the processing for that which is determined. Thus, the digital still camera 101-2 can more appropriately perform restoring processing and gamut conversion processing of the image data to be played. Thus, the digital still camera 101-2 can suppress unnecessary increase in load at the time of playing the content, and also can reduce unnecessary deterioration of the output image (improved image quality of the output image can be expected). Also, by suppressing the unnecessary increase in load at the time of playing the content, response time can be improved and costs can be reduced.

Figure 23:
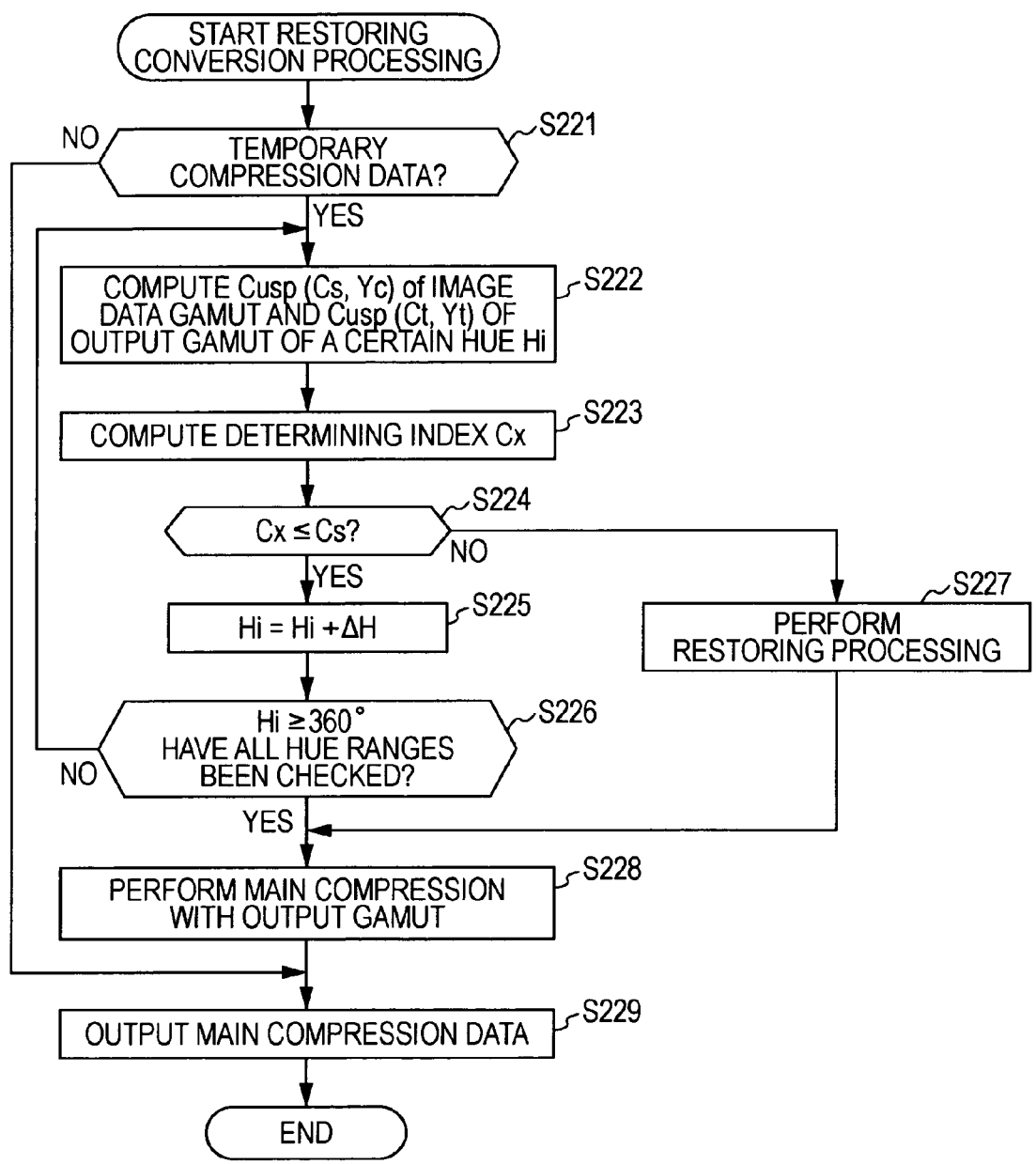
FIG. 23 is a flowchart describing an example of restoring conversion processing flow.

Note that as described with reference to FIGS. 23 through 24B, a gamut comparison is performed using the determining index Cx which is the saturation value. The determining index Cx can be readily computed as described with reference to FIGS. 24A and 24B and so forth above, whereby the control unit 311 can control the execution of the restoring processing and gamut conversion processing.

Also, as described above, in the event of recording the image data on the optical disk 110, the digital still camera 101-1 generates restoring metadata and gamut metadata, appends this to the image data, and records this along with the image data on the optical disk 110. That is to say, the digital still camera 101-1 can more readily comprehend the gamut conversion state of the image data, more readily perform control of the restoring processing and gamut conversion processing, and can more readily perform the restoring processing and gamut conversion processing.

[Restoring Processing]

Next, details of the restoring processing the return (a portion of) the gamut of the image data to the state before temporary compression will be described. The restoring processing unit 312 executes restoring processing based on control of the control unit 311, and restores the image data gamut to the state before temporary processing.

Figure 26:
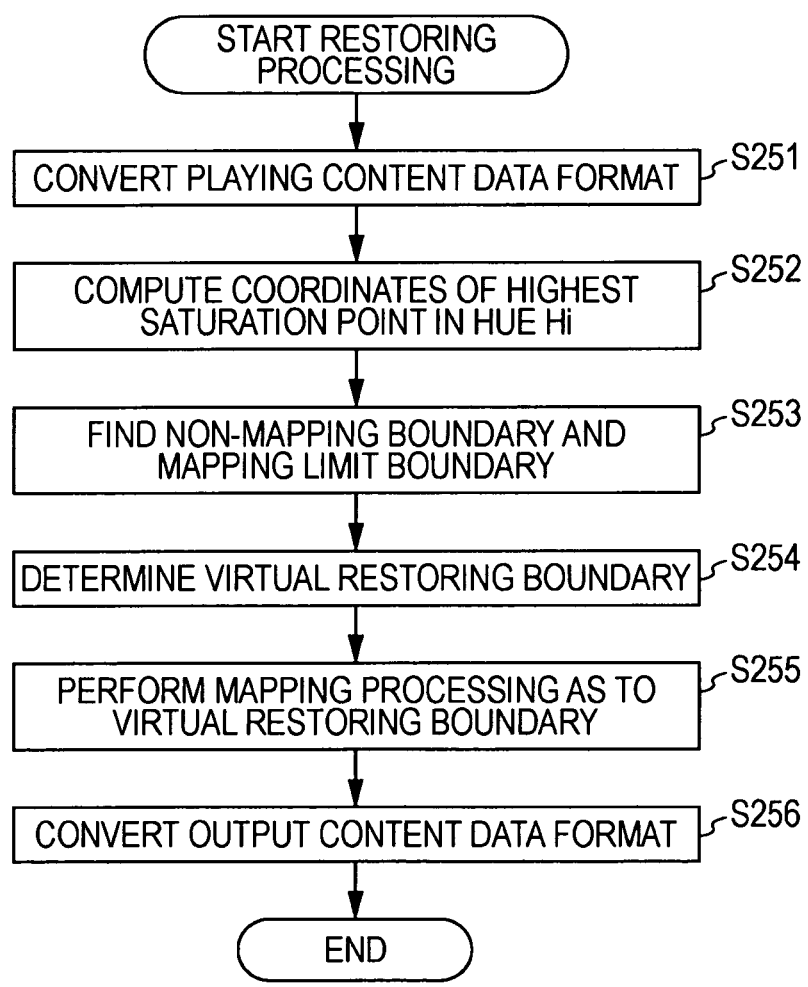
FIG. 26 is a flowchart describing an example of restoring processing flow.

An example of the restoring processing flow will be described with reference to the flowchart in FIG. 26. Upon the restoring processing having been started, in step S251 the restoring processing unit 312 converts the format of the playing content data which is various types of data of the image data read from the optical disk and so forth from YCC (Yi, Cbi, Cri) to YCH (Yi, Ci, Hi). This conversion is performed with Expressions (1) through (3), similar to the case of time-of-recording, for example.

In step S252, the restoring processing unit 312 computes the coordinates of the maximum saturation point (Cusp point) for the gamut of the hue Hi. The gamut information of the image data of the playing content data is provided in the Cusp table described with reference to FIG. 8. Accordingly, the restoring processing unit 312 calculates the CY coordinates of the Cusp point in the hue to be processed Hi, with a method similar to the case of the gamut conversion at the time of recording.

Figure 27:
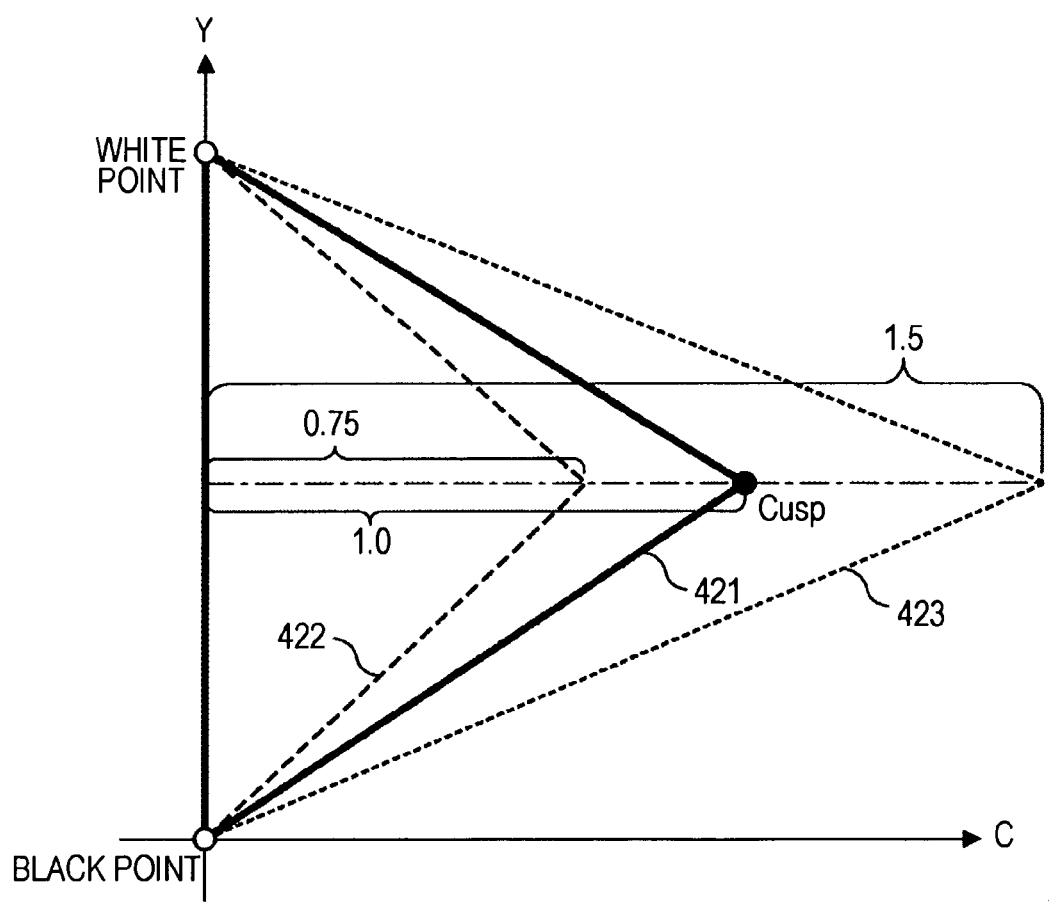
FIG. 27 is a diagram illustrating an example of the way in which determination is made for a restoring range.

In step S253, the restoring processing unit 312 obtains the non-mapping boundary (U-boundary 422) and mapping limit boundary (L-boundary 423) as shown in FIG. 27 with a saturation ratio, for example. With the temporary compression, the gamut between the U-boundary 422 and L-boundary 423 is converted to the gamut between the U-boundary 422 and T-boundary 422. That is to say, the restoring processing unit 312 finds the gamut converted range by finding the U-boundary 422 and L-boundary 423. In other words, the restoring processing unit 312 finds the restoration range for restoring the gamut before temporary compression.

The LU table (FIG. 11) is included in the restoring metadata, so the restoring processing unit 312 can readily find the U-boundary 422 and L-boundary 423 for each hue Hi by referencing the LU table.

Figure 28:
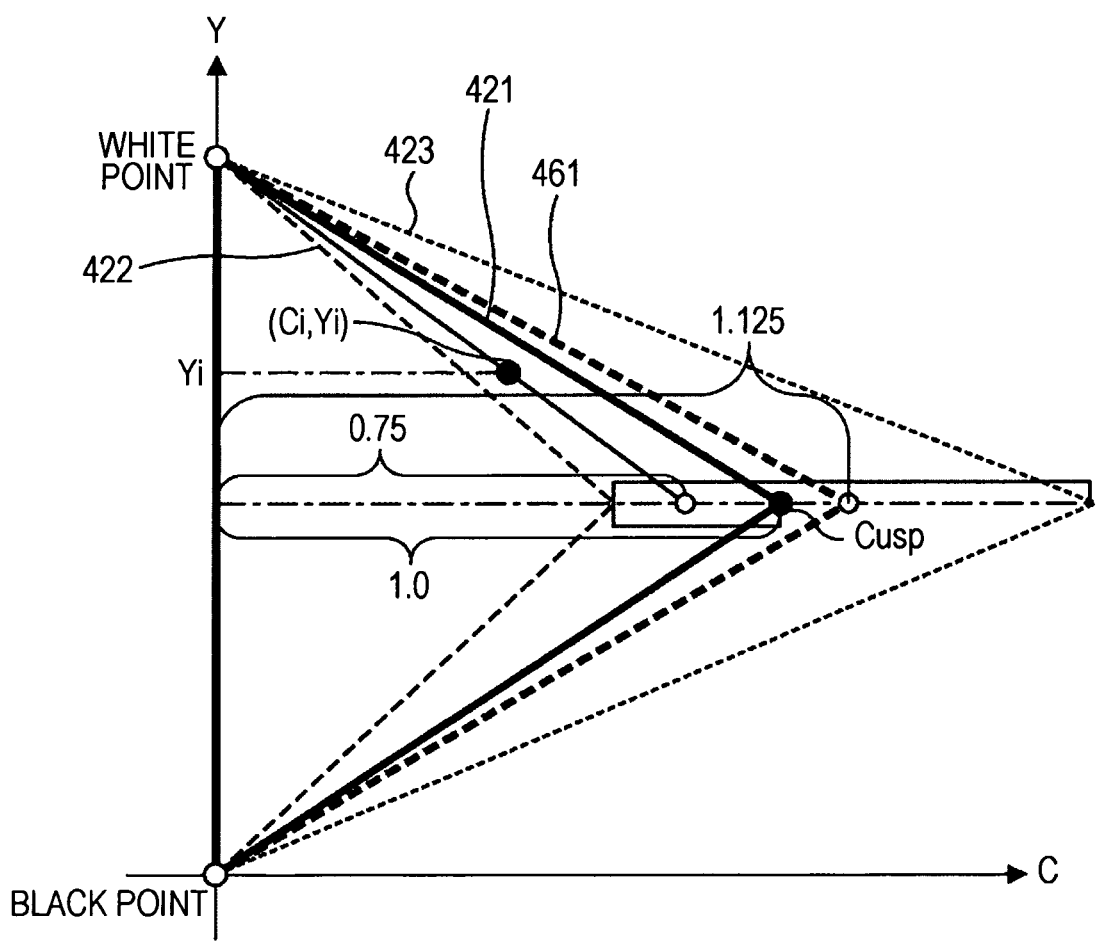
FIG. 28 is a diagram illustrating an example of the way in which determination is made for a virtual restoring boundary.

In step S254, the restoring processing unit 312 references the restoring function (FIGS. 17A and 17B) included in the restoring metadata, and as shown in FIG. 28, determines the virtual restoring boundary (V-boundary) 461 that corresponds to the saturation Ci of the pixel to be processed (Ci, Yi).

In step S255, the restoring processing unit 312 performs restoring mapping of the pixel to be processed on the V-boundary 461 found by the processing in step S254. The restoring processing unit 312 references the convergence point table (FIG. 18) included in the restoring metadata, and determines the convergence point of the hue to be processed Hi.

Figure 29:
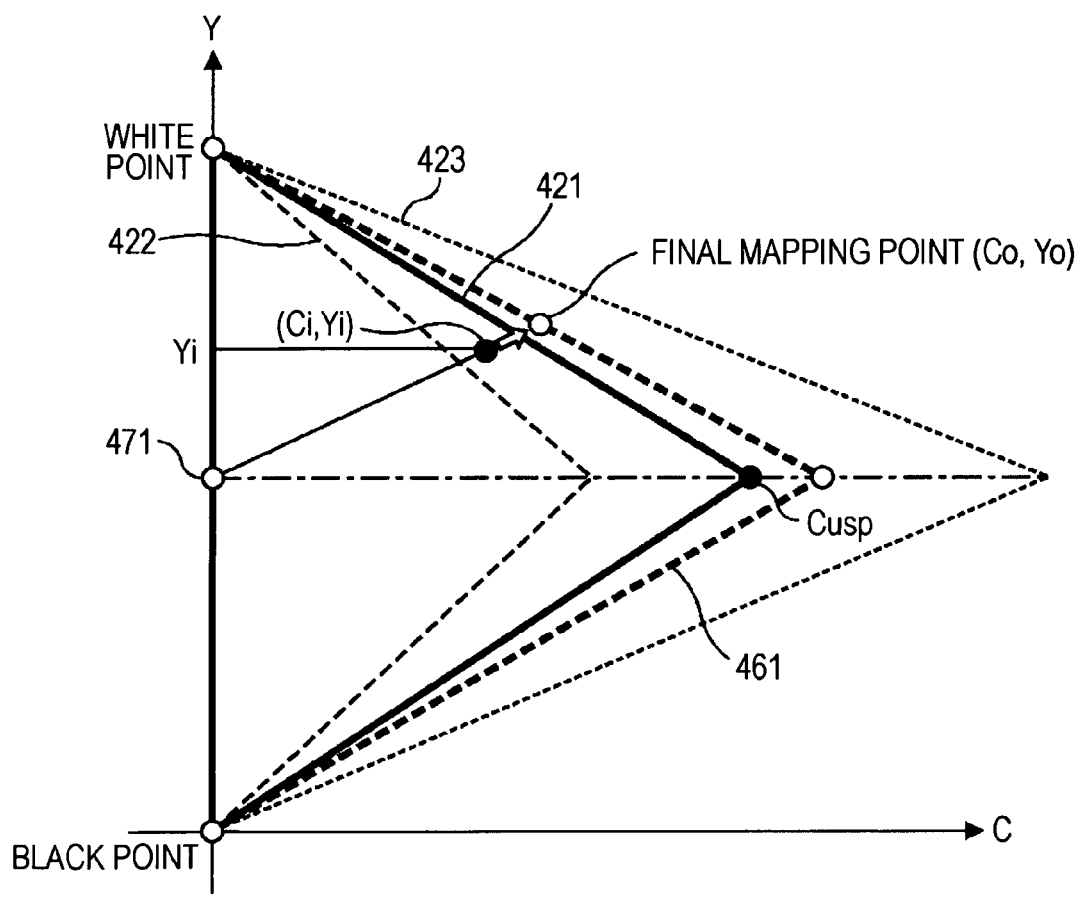
FIG. 29 is a diagram illustrating an example of the way in which restoring mapping is performed.

The restoring processing performs restoring mapping of the pixel to be processed, in the direction toward the pixel to be processed from the convergence point 471, as shown in FIG. 29, for example. That is to say, the pixel to be processed is moved (restoring mapping) to the intersection between a straight line linking the convergence point 471 and the pixel to be processed and the V-boundary 461 (final mapping point (Co, Yo)).

In step S256, the restoring processing unit 312 converts and outputs the format of the output content data which is image data subjected to restoring processing, from YCH (Yi, Ci, Hi) to YCC (Yi, Cbi, Cri), and ends the restoring processing.

Thus, the gamut conversion processing unit 313 performs a second gamut conversion (main compression) as described above, as to the image data of which the gamut has been restored to that of before temporary compression. As described above, in the event of recording the image data on the optical disk 110, the digital still camera 101-1 generates restoring metadata, appends this to the image data and records on an optical disk 110, so the digital still camera 101-2 can readily perform restoring processing as described above.

Note that the comparison method of the image data gamut and output gamut may be a method other than that described above with reference to FIG. 23, for example. Another example of restoring conversion processing will be described below.

2. Second Embodiment

[Another Example of Restoring Conversion Processing]

In the case of the first embodiment, the width of the output gamut is verified using the image data gamut as a standard. Therefore, in the case that even a small portion outside the image data gamut is included in the output gamut, control is performed to perform restoring processing. According to the second embodiment, the restoring conditions are relaxed, and an output gamut width is verified using a range wider than the image data gamut.

Another example of flow of the restoring conversion processing in this case is described with reference to the flowchart in FIG. 30. In the case of the flowchart in FIG. 30, the various processing (steps S271 through S279) are executed basically the same as in the case of the various processing in FIG. 23 (steps S221 through S229). However, the restoring condition used in step S274 differs for the case of step S224 in FIG. 23.

Figure 30:
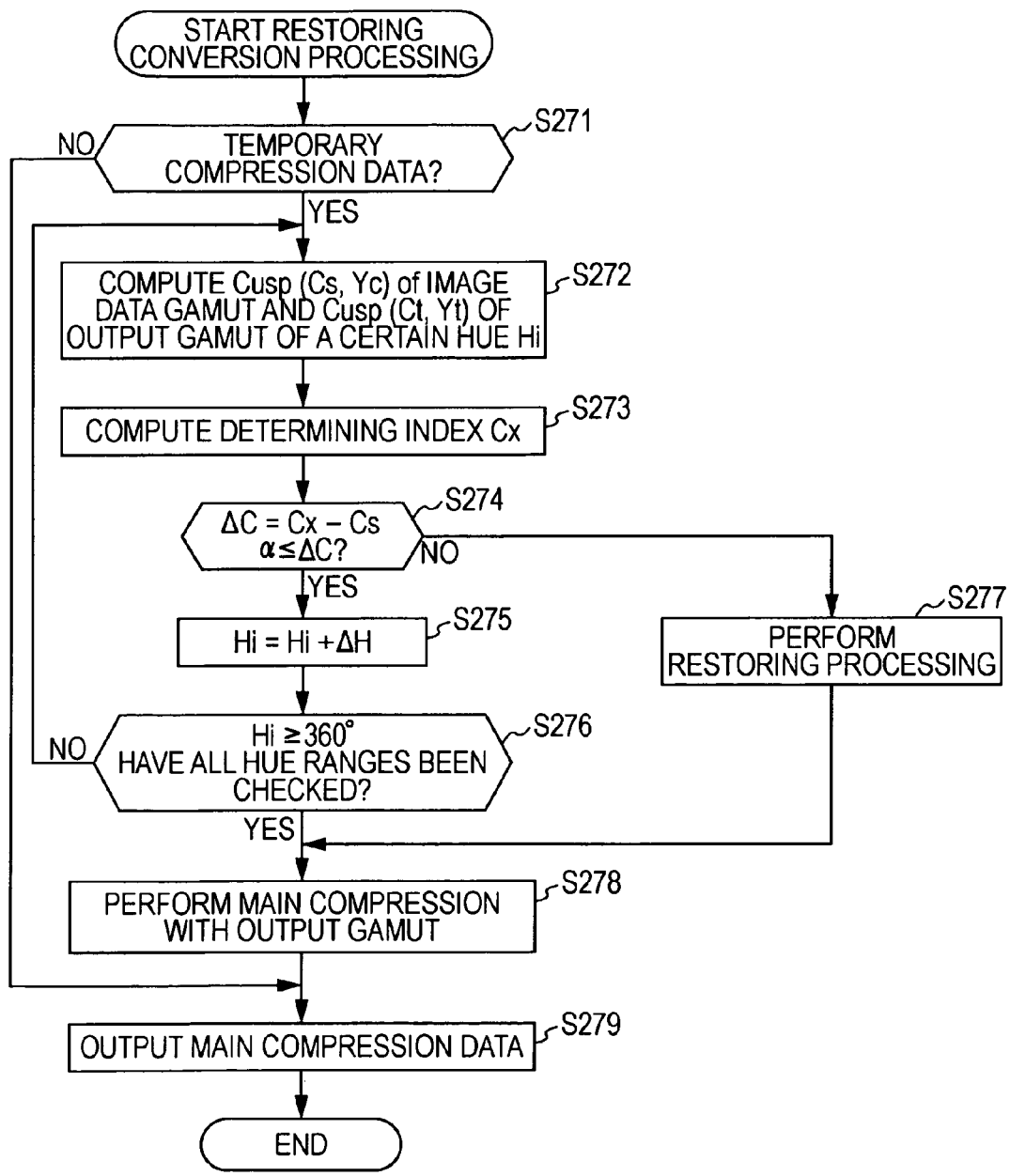
FIG. 30 is a flowchart describing another example of restoring conversion processing flow.

In the case of step S274 in FIG. 30, the control unit 311 determines whether or not the difference $\Delta C$ ($\Delta C = Cx - Cs$) between the determining index Cx and the saturation value Cs of the Cusp point of the image data gamut is at or above a fixed value $\alpha$.

In this case, the size of $\Delta C$ becomes the degree of width itself, and the fixed value $\alpha$ is the amount of relaxing of the standard for verifying the output gamut width. That is to say, in this case, only in the case that the output gamut is spread outside the image data gamut by a fixed amount $\alpha$ is determination made that restoring processing should be performed. That is to say, the restoring condition has been relaxed. Thus, the digital still camera 101-2 can further suppress execution of the restoring processing, and the load can be reduced.

Note that by independently setting the fixed value $\alpha$ for each hue, weighting can be performed on the restoring conditions for each hue. For example, restoring processing may be made easier to perform for more important hues, and restoring processing made more difficult to perform for less important hues that affect vision. By thus controlling, the digital still camera 101-2 can control the execution of the restoring processing more appropriately according to the visual effects of the restoring processing. Accordingly, the digital still camera 101-2 can suppress actual effects on the image quality, while reducing load.

3. Third Embodiment

[Another Example of Restoring Conversion Processing]

In the case of the first embodiment, the width of the output gamut is verified for each hue, and control is performed to perform restoring processing in the case that a portion outside the image data gamut is included in the output gamut for even one hue. According to the third embodiment, the restoring condition is relaxed, and the width of the output gamut is verified using a range wider than the image data gamut as a standard.

Figure 31:
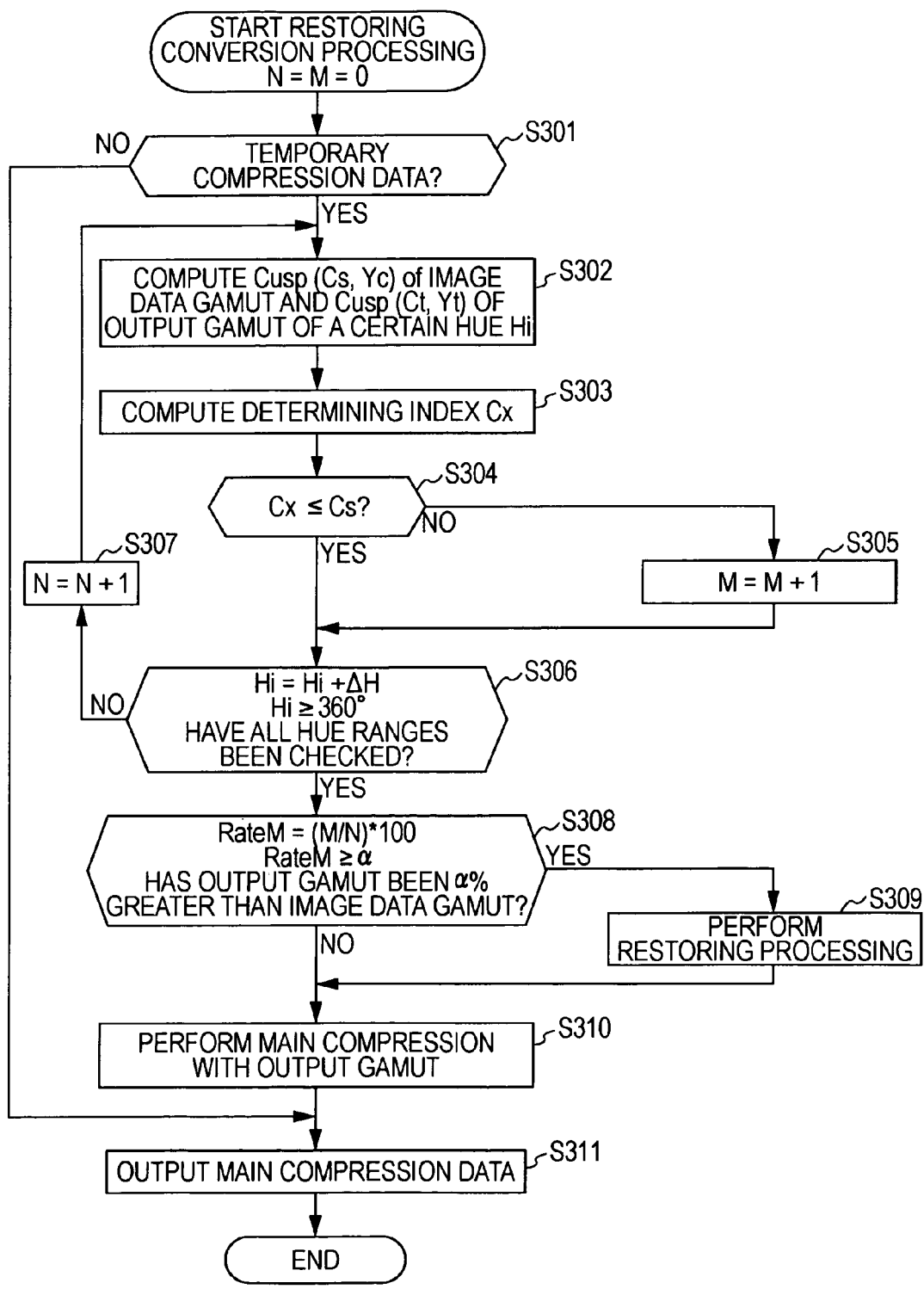
FIG. 31 is a flowchart describing yet another example of restoring converting processing flow.

Yet another example of a restoring conversion processing flow in this case will be described with reference to the flowchart in FIG. 31. In the case of the flowchart shown in FIG. 31, the processing in steps S301 through S304 are executed similarly as the processing in steps S221 through S224 in FIG. 23.

However, in the case that the determining index Cx is determined to be greater than the saturation value Cs, the flow is advanced to step S305. In this case, a portion outside the image data gamut is determined to be included in the output gamut. In step S305, the control unit 311 counts the gamuts wherein a portion outside the image data gamut is determined to be included in the output gamut, using a variable M (M=M+1). Upon the variable M which shows the number of gamuts determined that a portion outside the image data gamut is included in the output gamut is incremented, the flow is advanced to step S306.

In step S306, the control unit 311 adds an interval $\Delta H$ between the representative hues to the hues to be processed Hi, thereby switching the processing target to the next hue (representative hue). Also, the control unit 311 determines whether or not the value of the hue to be processed Hi is 360 degrees or greater, i.e., whether the image data gamut and output gamut have been compared for all hues.

In the case determination is made that the hues to be processed is less than 360 degrees, and that an unprocessed hue for which comparison of the image data gamut and output gamut has not been performed exists, the flow is advanced to step S307. In step S307, the control unit 311 uses a variable N to count the number of processed hues (N=N+1). Upon the variable N which shows the number of hues for which comparison of the image data gamut and output gamut has been performed is incremented, the flow is advanced to step S302.

That is to say, in step S306, the processing in steps S302 through S307 is repeated until determination is made that comparison of the image data gamut and output gamut has been performed for all hues (representative hues).

In the case determination is made in step S306 that comparison of the image data gamut and output gamut has been performed for all hues (representative hues), the flow is advanced to step S308.

In step S308, the control unit 311 computes the rate RateM of the variable M as to the number of processed hues N (RateM=(M/N)×100), and determination is made as to whether the RateM is at or above a fixed value α. That is to say, determination is made as to whether a hue that includes a portion outside the image data gamut in the output gamut exists in α% or greater of all hues.

In the case determination is made that RateM≧α holds, the flow is advanced to step S309. In step S309, the restoring processing unit 312 performs restoring processing, and in step S310, the gamut conversion processing unit 313 performs gamut conversion processing.

Also, in the case determination is made that RateM<α holds, the flow is advanced to step S310, and the image data gamut is main-compressed to the output gamut. In step S311, the gamut conversion processing unit 313 outputs main compression data, and ends the restoring conversion processing.

Also, in the case determination is made in step S301 that the image data read from the optical disk 110 is main compression data, the flow is advanced to step S311. In this case, in step S311 the control unit 311 outputs the main compression data to the display unit 305 without performing restoring processing and gamut conversion processing, and ends the restoring conversion processing.

Thus, the digital still camera 101-2 can relax the restoring conditions, further suppress executing the restoring processing, and reduce the load.

4. Fourth Embodiment

[Another Example of Restoring Conversion Processing]

In the case of the first embodiment, basically the output gamut and image data gamut are compared for all hues. According to the fourth embodiment, the output gamut and image data gamut are compared for only a portion of the hues.

Figure 32:
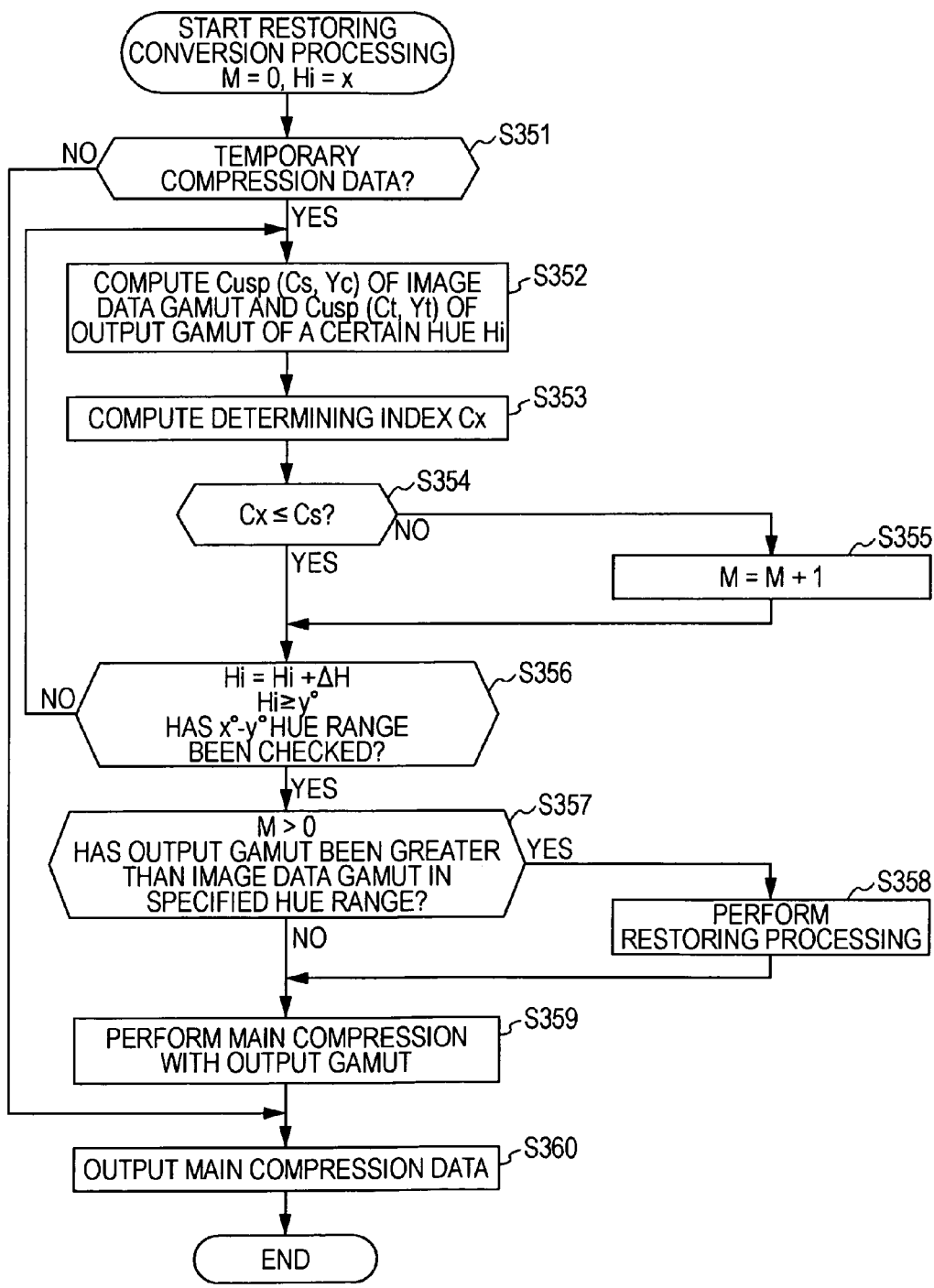
FIG. 32 is a flowchart describing yet another example of restoring converting processing flow.

Yet another example of the restoring conversion processing flow will be described with reference to the flowchart in FIG. 32. In the case of the flowchart shown in FIG. 32, the processing in steps S351 through S355 are executed similarly to the processing in steps S301 through S305.

In step S356, the control unit 311 performs switching of the hues to be processed Hi, similar to the case in step S306, and determines whether or not comparisons have been made between the image data gamut and output gamut for all the hues of x° through y° which is a predefined range.

In the case determination is made that the hue to be processed is smaller than y°, determination is made that processing has not been performed for all the hues of x° through y° which is a predefined range, the flow is returned to step S352, and the processing thereafter is repeated for a new hue to be processed Hi.

In the case determination is made that the hue to be processed is greater than y°, determination is made that processing has been performed for all the hues of x° through y° which is a predefined range, and the flow is advanced to step S357.

In step S357, the control unit 311 determines whether or not the variable M is 1 or greater, and whether a portion wider than the image data gamut exists in the output gamut.

In the case the variable M is 1 or greater, the flow is advanced to step S358, and the gamut conversion processing in step S359 is performed via the restoring processing. Also, in the case the variable M is 0 or less, the flow is advanced to step S359, and the gamut conversion processing (main compression) is performed.

In step S360, the main compression data is output externally.

Thus, gamut comparison may be performed for only a portion of the hues. Thus, for example, an arrangement may be made wherein only the hues sensitive to the eye, such as skin color or sky color, are checked, and restoring is performed only when the range of these hues is large. Note that there may be multiple ranges of hues. Also, this may be combined with the method according to the second embodiment, and weighting may be performed as to the restoring conditions for each hue in the portion of hues being subjected to gamut comparison.

5. Fifth Embodiment

[Another Example of Restoring Conversion Processing]

In the case of the first embodiment, the comparison between the output gamut and image data gamut is performed one hue at a time. In the case of the fifth embodiment, a known standard color space is used as the output gamut and image data gamut. In this case, the size relation of the output gamut and image data gamut is already clear. Thus, the control unit 311 determines whether or not to restore, by referencing table data (gamut comparison table) which divides the known standard color space by width.

FIG. 33 is a diagram showing a gamut comparison table. As shown in FIG. 33, the gamut comparison table 601 divides the known standard color space according to the width thereof, and a reference number is assigned in order from the narrowest width. The same reference number is assigned for color spaces having approximately the same width. According to the example in FIG. 33, the color spaces sRGB and Apple RBG to which the reference number "1" is assigned are the narrowest, and Adobe RGB and NTSC RGB which are assigned the reference number "2" are the next narrowest. The bg-RGB to which is assigned the reference number "3" is the next narrowest, and the sc-RGB to which is assigned the reference number "4" is the next narrowest.

Figure 34:
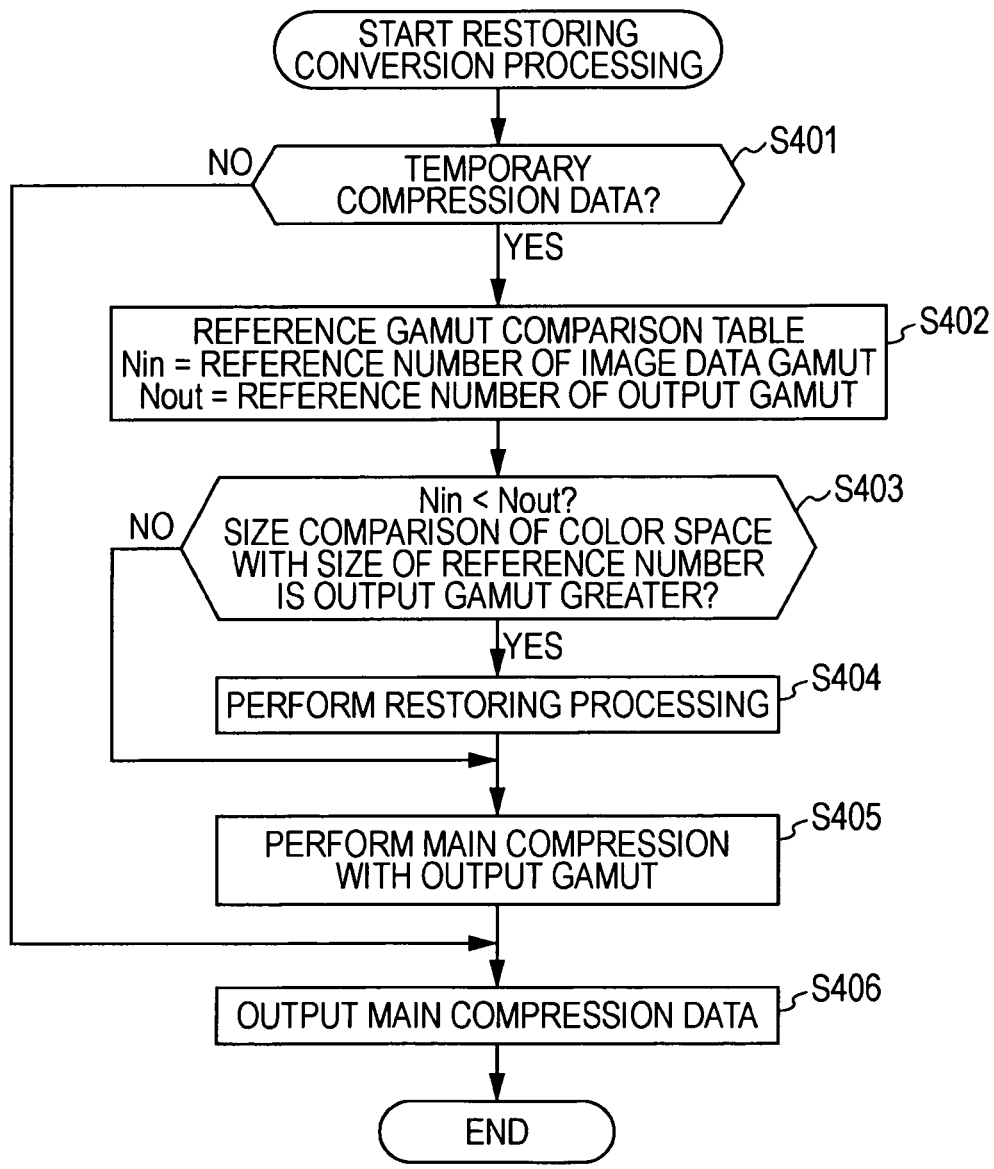
FIG. 34 is a flowchart describing yet another example of restoring converting processing flow.

An example of the restoring conversion processing flow in this case is described with reference to the flowchart in FIG. 34. Upon the restoring conversion processing having been started, the control unit 311 determines whether or not the image data read from the optical disc 110 is temporary compression data. In the case that the image data read from the optical disc 110 is temporary compression data, the flow is advanced to step S402.

In step S402 the control unit 311 references the gamut comparison table held beforehand, assigns reference numbers of the image data gamut to a variable Nin, and assigns reference numbers of the output gamut to a variable Nout.

In step S403, the control unit 311 compares the size of the variables Nin and Nout, and determines whether or not the variable Nout is greater than the variable Nin. That is to say, the control unit 311 compares size relation of the reference number assigned to the image data gamut and the reference number assigned to the output gamut, thereby comparing the size of the output gamut and image data gamut. In the case that the variable Nout is greater than the variable Nin and that the output gamut is wider than the image data gamut, the flow is advanced to step S404.

In step S404 the restoring processing unit 312 performs restoring processing. Upon the restoring processing ending, the flow is advanced to step S405. Also, in the case determination is made in step S403 that the variable Nout is the same as or smaller than the variable Nin and that the output gamut is not wider than the image data gamut, the flow is advanced to step S405.

In step S405 the gamut conversion processing unit 313 main-compresses the temporary compression data to the output gamut. Upon the image data having been subjected to main compression, the flow is advanced to step S406. In step S406, the gamut conversion processing unit 313 outputs the main compression data to the display unit 305, and ends the restoring conversion processing.

Note that in the case determination is made in step S401 that the image data read from the optical disk 110 is main compression data, the flow is advanced to step S406. In step S406, the control unit 311 outputs the main compression data to the display unit 305, and ends the restoring conversion processing.

As described above, in the case that a known standard color space is used as the output gamut and the image data gamut, the digital still camera 101-2 can more readily perform gamut comparison by performing gamut comparison with reference numbers using the gamut comparison table 601.

Note that the gamut conversion table only has to show the size relation of the gamuts, and the format thereof is optional. Also, the gamut conversion processing may be varied as appropriate according to the format of the gamut conversion table.

6. Sixth Embodiment

[Personal Computer]

The above-described series of processing can be carried out by hardware or by software. In this case, the sixth embodiment may assume the form of a personal computer such as shown in FIG. 35, for example.

In FIG. 35, a CPU (Central Processing Unit) 701 of the personal computer 700 executes various types of processing according to programs stored in a ROM (Read Only Memory) 702 or programs loaded from a storage unit 713 to a RAM (Random Access memory) 703. Data and so forth for the CPU 701 to execute various types of processing is also stored in the RAM 703.

The CPU 701, ROM 702 and RAM 703 are mutually connected via a bus 704. The bus 704 is also connected to an input/output interface 710. The input/output interface 710 is connected to an input unit 711 made up of a keyboard, mouse, or the like, an output unit 712 made up of a display such as a CRT (Cathode Ray Tube) or LCD (Liquid Crystal Display) and a speaker or the like, a storage unit 713 made up of a hard disk or the like, and a communication unit 714 made up of a modem or the like. The communication unit 714 performs communication processing via a network such as the Internet.

The input/output interface 710 is also connected as appropriate to a drive 715, a removable medium 721 such as a magnetic disk, optical disk, magneto-optical disk, or semiconductor memory is mounted thereto as appropriate, and the computer program read therefrom is installed in the storage unit 713 as appropriate.

In the case of software executing the above-described series of processing, a program making up the software may be installed from a network or recording medium. The recording medium may be a removable medium such as a magnetic disk (including flexible disk), optical disk (including CD-ROM (Compact Disc-Read Only Memory), DVD (Digital Versatile Disc)), magneto-optical disk (including MD (Mini Disc)), or semiconductor memory wherein a program is recorded, or further may be ROM 702 wherein a program is recorded that is distributed to users in a state built in to the device main unit beforehand, and a hard disk included in the storage unit 713.

Note that the programs which the computer executes may be programs wherein the processing is performed in a time-series manner in the order described in the present Specification, or may be in parallel, or may be a program wherein processing is performed as appropriate whenever called up.

Also, according to the present Specification, the steps describing a program recorded on a recording medium includes processing performed in a time-series manner in the described order, but is not restricted to processing in a time-series manner and includes processing executed in parallel or individually. Also, according to the present Specification, the term "system" refers to the entirety of equipment made up of multiple devices.

Also, the above device described as being configured as one device (or processing unit) may be divided and configured as multiple devices (or processing units). Conversely, the configuration described above as multiple devices (or processing units) may be configured as one integrated device (or processing unit). Also, a configuration other than that described above may be appended to the configurations of each device (or each processing unit). Further, a portion of a certain device (or processing unit) may be included in another device (or processing unit) as long as the configuration and operation of the overall system are substantially the same. That is to say, the embodiments of the present invention are not limited to the embodiments described above, and various types of modifications may be made within the scope and intent of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
  a control unit operable to determine whether to perform:
    a first gamut conversion processing to convert an image gamut into a target gamut after performing restoring processing to return at least a portion of the image gamut into a state before gamut conversion, wherein the first gamut conversion processing is performed if the target gamut is wider than the image gamut, or
    a second gamut conversion processing without performing the restoring processing, wherein the second gamut conversion processing is performed if the image gamut is wider than the target gamut,
    wherein the image gamut is subjected to the gamut conversion before the determination by the control unit;
  a restoring unit operable to execute the restoring processing according to control by the control unit; and
  a gamut conversion unit operable to execute the determined gamut conversion processing according to control by the control unit.

2. The information processing device according to claim 1, wherein in the case that the target gamut is within a predetermined range wider than the image gamut,
the control unit determines the first gamut conversion processing,
the restoring unit executes the restoring processing as to the image, and
the gamut conversion unit executes the first gamut conversion processing as to the image subjected to the restoring processing; and
wherein in the case that the image gamut is within the predetermined range wider than the target gamut,
the control unit determines the second gamut conversion processing, and
the gamut conversion unit executes the second gamut conversion processing as to the image.

3. The information processing device according to claim 1, wherein in the case that, of hues in the target gamut, the ratio of hues including other than the image gamut as to all hues is greater than a predetermined ratio,
the control unit determines the first gamut conversion processing,
the restoring unit executes the restoring processing as to the image, and
the gamut conversion unit executes the first gamut conversion processing as to the image subjected to the restoring processing; and wherein in the case that the ratio is not greater than the predetermined ratio,
the control unit determines the second gamut conversion processing, and
the gamut conversion unit executes the second gamut conversion processing as to the image.

4. The information processing device according to claim 1, wherein in the case that a predetermined hue includes the target gamut being wider than the image gamut,
the control unit determines the first gamut conversion processing,
the restoring unit executes the restoring processing as to the image, and
the gamut conversion unit executes the first gamut conversion processing as to the image subjected to the restoring processing, and wherein in the case that the predetermined hue includes the image gamut being wider than the target gamut,
the control unit determines the second gamut conversion processing, and
the gamut conversion unit executes the second gamut conversion processing as to the image.

5. The information processing device according to claim 1, wherein the control unit compares the image gamut and the target gamut for each hue.

6. The information processing device according to claim 5, wherein a brightness value of a maximum saturation point of the target gamut is smaller than a brightness value of a maximum saturation point of the image gamut,
the control unit compares a saturation value of a point of which the brightness value is same as the maximum saturation point of the image gamut and the saturation value of the maximum saturation point of the image which are on a straight line linking the maximum saturation point of the target gamut and a black point; and
wherein the brightness value of the maximum saturation point of the target gamut is the same as or greater than the brightness value of the maximum saturation point of the image gamut,
the control unit compares the saturation value of a point of which the brightness value is same as the maximum saturation point of the image gamut and the saturation value of the maximum saturation point of the image which are on a straight line linking the maximum saturation point of the target gamut and a white point.

7. The information processing device according to claim 5, wherein the control unit compares the image gamut and the target gamut, using a gamut comparison table that indicates a size relation of known standard gamut differences.

8. The information processing device according to claim 1, wherein the control unit executes the first gamut conversion processing or the second gamut conversion processing only in a case that the image gamut does not match the target gamut.

9. The information processing device according to claim 1, further comprising:
a playing unit operable to read and play the image from a recording medium, wherein the control unit determines which of the first gamut conversion processing or the second gamut conversion processing to perform as to the image read from the recording medium by the playing unit.

10. An information processing method comprising:
determining whether to perform:
a first gamut conversion processing to convert an image gamut into the target gamut after performing restoring processing to return at least a portion of the image gamut into the state before the gamut conversion, wherein the first gamut conversion processing is performed if the target gamut is wider than the image gamut, or
a second gamut conversion processing without performing the restoring processing, wherein the second gamut conversion processing is performed if the image gamut is wider than the target gamut, wherein the image gamut is subjected to gamut conversion before the determination by the control unit,
wherein the image gamut is subjected to the gamut conversion before the determination by the control unit;
executing the restoring processing according to control by the control unit; and
executing the determined gamut conversion processing according to the determination by the control unit.

11. A non-transitory computer-readable storage medium having stored thereon, a computer program having at least one code section, the at least one code section being executable by one or more processors for causing a computer to perform steps comprising:
determining whether to perform:
a first gamut conversion processing to convert an image gamut into a target gamut after performing restoring processing to return at least a portion of the image gamut into a state before gamut conversion, wherein the first gamut conversion processing is performed if the target gamut is wider than the image gamut, or
a second gamut conversion processing without performing said restoring processing, wherein the second gamut conversion processing is performed if the image gamut is wider than the target gamut,
wherein the image gamut is subjected to the gamut conversion before the determination by the control unit;
executing the restoring processing according to control by the control unit; and
executing the determined gamut conversion processing according to control by the control unit.

* * * * *